(12) United States Patent
Moteki et al.

(10) Patent No.: US 8,059,938 B2
(45) Date of Patent: Nov. 15, 2011

(54) PICTURE RECORDING APPARATUS

(75) Inventors: Masataka Moteki, Ome (JP); Seigo Ito, Hanno (JP); Masao Kubo, Kawagoe (JP); Masashi Horiguchi, Ebina (JP); Yukiyoshi Fujishiro, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1600 days.

(21) Appl. No.: 11/240,448

(22) Filed: Oct. 3, 2005

(65) Prior Publication Data

US 2006/0072406 A1 Apr. 6, 2006

(30) Foreign Application Priority Data

Oct. 5, 2004 (JP) .................................. 2004-292885

(51) Int. Cl.
*H04N 5/93* (2006.01)
(52) U.S. Cl. .................... 386/278; 386/281; 386/283
(58) Field of Classification Search ............. 386/45–46, 386/95–96, 125–126, 259
See application file for complete search history.

(56) References Cited

U.S. PATENT DOCUMENTS

| | | | |
|---|---|---|---|
| 6,584,272 B1 * | 6/2003 | Fukushima et al. | 386/46 |
| 2002/0012304 A1 * | 1/2002 | Nakahara et al. | 369/53.24 |
| 2002/0021647 A1 * | 2/2002 | Aoki | 369/59.25 |

FOREIGN PATENT DOCUMENTS

JP 2001-052373 2/2001

* cited by examiner

*Primary Examiner* — Jamie Atala
(74) *Attorney, Agent, or Firm* — Pillsbury Winthrop Shaw Pittman, LLP

(57) ABSTRACT

A picture recording apparatus which can record a picture on a write-once medium having an element which specifies a first size on a recording area assigned to data saving in edit processing, and an element which subtracts the first size from a remaining amount of recording area in the write-once medium to calculate a second size secured for recording, characterized in that a recording size is managed using the second size as an upper limit of a recordable size, and that an editing area is secured using the first size as a lower limit.

9 Claims, 20 Drawing Sheets

PICTURE RECORDING APPARATUS

CROSS-REFERENCE TO RELATED APPLICATIONS

This application is based upon and claims the benefit of priority from prior Japanese Patent Application No. 2004-292885, filed Oct. 5, 2004, the entire contents of which are incorporated herein by reference.

BACKGROUND OF THE INVENTION

1. Field of the Invention

This invention relates to a picture recording apparatus capable of reliably recording a picture on a write-once-read-many recording medium such as a DVD-R.

2. Description of the Related Art

Recording formats for digital versatile disks (DVDs) include a DVD video format used for sell DVD software and the like, and a DVD VR format used in DVD recorders and capable of edit processing.

The DVD VR format is mainly used in DVD-RAMs and DVD-RWs. The DVD-RAM and DVD-RW are rewritable media, which is convenient for users who often edit recorded pictures, but these are relatively high in unit cost.

On the contrary, DVD-Rs are relatively inexpensive media. Heretofore, recording on the DVD-R has mainly been performed in the DVD video format due to great importance placed on reproduction compatibility with DVD players, but recording on the DVD-R in the DVD VR format is also formally admitted as a standard in DVD Forum.

Many advantages are brought to the users in terms of operability and costs owing to the low-cost recording on the DVD-R in the DVD VR format that allows flexibility in editing.

However, the DVD-R is a write-once medium, so that a recording area of a disk is consumed by performing recording and editing.

This leads to such a problem that it might be impossible to implement editing because a remaining amount of recording area is not sufficient after a large volume of data has been recorded on the DVD-R.

BRIEF SUMMARY OF THE INVENTION

An aspect of the present invention provides an apparatus which records a picture on a write-once medium, the apparatus comprising:

data size specifying means for specifying a first size on a recording area assigned to data saving in edit processing;

data size calculating means for subtracting the first size from a remaining amount of recording area in the write-once medium to calculate a second size secured for recording;

recording means for recording an input picture using the second size as an upper limit; and edit means for editing the recorded picture using the first size as a lower limit.

Additional advantages of an aspect of the invention will be set forth in the description which follows, and in part will be obvious from the description, or may be learned by practice of the invention. The advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will hereinafter be described using the drawings.

It is to be noted that an information recording/reproducing apparatus according to the present invention also includes, for example, a personal computer (PC), and it should be appreciated that information to be recorded on a recording medium may be document information and the like. In addition, a digital video recorder will be described by way of example in the embodiments of the invention.

Figure 1:
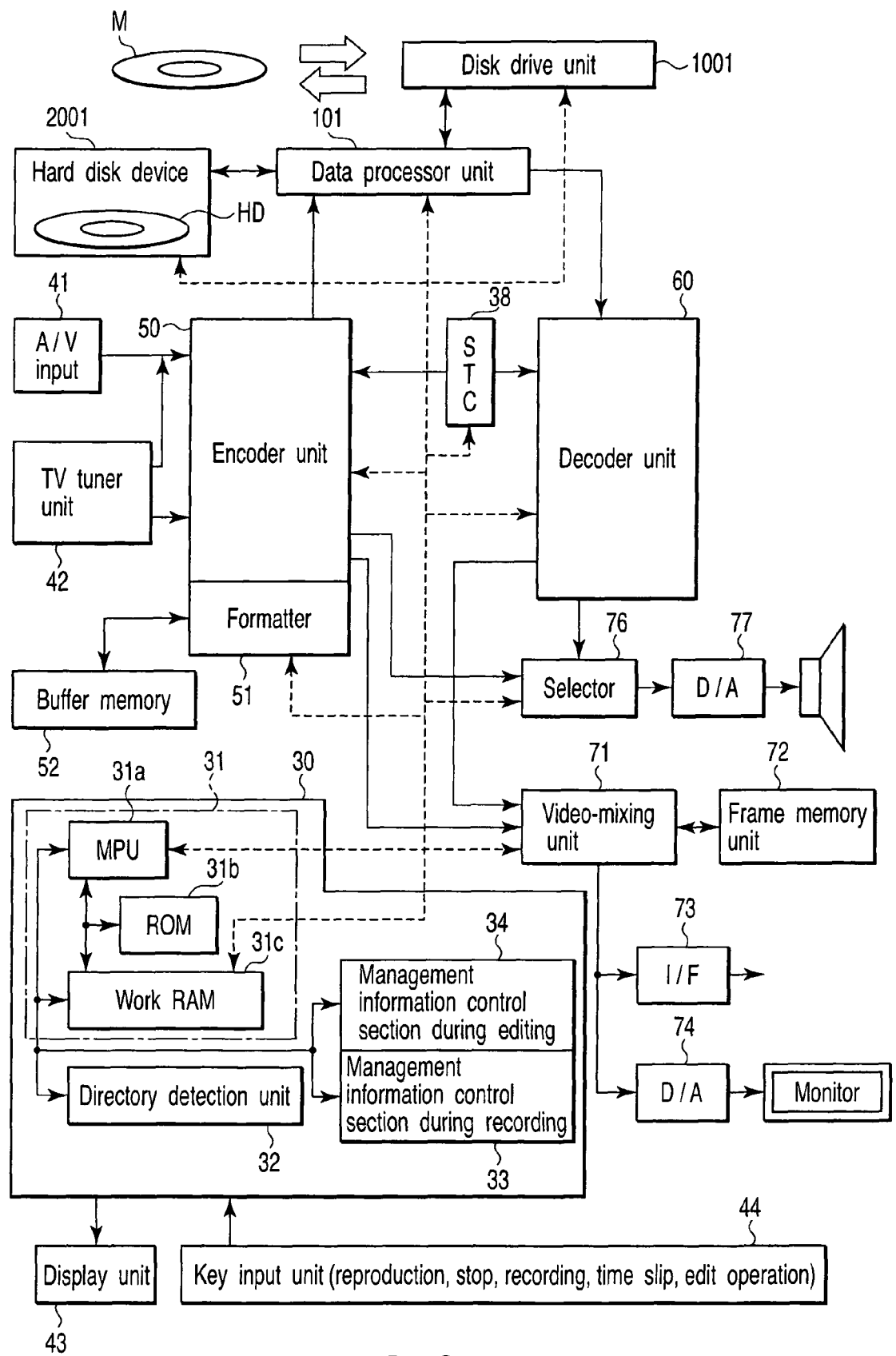
FIG. 1 is a block diagram to explain an overview of a picture recording apparatus of the present invention.

FIG. 1 shows one embodiment of the information recording/reproducing apparatus to which this invention is applied. In the recording/reproducing apparatus of FIG. 1, an example will be described wherein there are provided, as the recording media, an optical disk based on a DVD standard and a hard disk installed within a hard disk device, but it is also possible to use, for example, a semiconductor memory (memory card) as the recording medium instead of the hard disk or the optical disk such as the DVD.

An information recording/reproducing apparatus (video recorder) 1 shown in FIG. 1 has a disk drive unit 1001 capable of building video files, for example, in an optical disk (medium) M based on the DVD standard. It should be appreciated that the optical disk M may be based on, for example, on a CD standard, or may be a high-density (HD) DVD or a blue-ray disk in which recording capacity is increased as compared with the optical disks based on current DVD standards.

Although not described in detail, the disk drive unit 1001 has a rotation control system which rotates the optical disk M at a predetermined speed, a laser drive system which emits laser light having a predetermined wavelength to record information on a recording surface of the optical disk M or to reproduce information recorded on the optical disk M, a laser optical system which guides the laser light of the laser drive system, and the like.

The information recording/reproducing apparatus (video recorder) 1 can also build the video files in a hard disk HD contained in a hard disk device (hereinafter indicated as an HDD) 2001.

Data (recording data) to be recorded on the optical disk M installed in the disk drive unit 1001 or on the hard disk HD of the HDD 2001 will be recorded on a (predetermined) recording medium (the optical disk M or the hard disk HD) under the control of a data processor unit 101. Further, under the control of the data processor unit 101, recorded data is read (reproduction data is obtained) from the optical disk M in the disk drive unit 1001 or the hard disk HD of the HDD 2001.

The data processor unit 101 handles the recording data or the reproduction data in predetermined units, and includes a buffer circuit, modulation/demodulation circuits, an error correction section, etc.

The picture recording apparatus 1 has, as main units, an encoder unit 50 which is an encode processing unit to record input information, a decoder unit 60 which is a data processing unit to reproduce data already recorded, and a microcomputer block 30 which controls an operation of the picture recording apparatus 1.

The encoder unit 50 has a video or audio analog-to-digital converter which digitizes an input analog video signal or analog audio signal, a video encoder, and an audio encoder. It also includes a sub picture encoder.

An output of the encoder unit 50 is converted into a predetermined DVD-RAM format in a formatter 51 including a buffer memory, and supplied to the above data processor unit 101.

There are input, to the encoder unit 50, an external analog video signal and an external analog audio signal from an AV input unit 41, or an analog video signal and an analog audio signal from a TV tuner unit 42.

It is to be noted that when a compressed digital video signal or digital audio signal is directly input, the encoder unit 50 can also supply the compressed digital video signal or digital audio signal directly to the formatter 51. The encoder unit 50 can also supply an analog-to-digital-converted digital video signal or audio signal directly to a video mixing unit 71 or an audio selector 76.

Although not shown, the encoder unit 50 includes the video encoder, and this video encoder converts the digital video signal into a digital video signal compressed at a variable bit rate based on, for example, an MPEG-2 or MPEG-1 standard.

Furthermore, the digital audio signal is converted into a digital audio signal compressed at a variable bit rate based on, for example, an MPEG or AC-3 standard, or into a (uncompressed) digital audio signal such as linear PCM.

A sub picture signal within a DVD video signal is encoded (run-length encoding) in the sub picture encoder when the sub picture signal is directly input via the AV (audio/video) input unit 41 (e.g., a signal from a video player provided with an independent output terminal for the sub picture signal) or when a broadcast signal in the DVD video signal having an equivalent data structure is received by the TV tuner unit 42, thereby building a bit map (sub picture data) of a sub picture.

An encoded digital video signal, digital audio signal and sub picture data are packed as a video pack, an audio pack and a sub picture pack in the formatter 51. The video pack, the audio pack and the sub picture pack are further aggregated (integrated), and converted into a format (DVD video format) defined in a DVD video standard or a format (DVD VR format) defined in a DVD recording standard.

Information (the packs of video, audio or sub picture data) formatted in the formatter 51 and management information (file system) created by an MPU (CPU) 31a (shown later) are supplied to the HDD 2001 or the disk drive unit 1001 via the data processor unit 101, and can be recorded on the hard disk HD or the optical disk M. It is to be noted that the information recorded on the hard disk HD or the optical disk M can be replaced with each other or duplicated via the data processor unit 101. That is, data already recorded on the hard disk HD can be moved to the optical disk M or duplicated, and data recorded on the optical disk M can also be moved to the hard disk HD or duplicated.

Furthermore, the data recorded on the hard disk HD or the optical disk M, such as video objects of programs, can be edited to delete some or all of the video objects or to synthesize (connect) the optional number of objects. This is because the format according to the present invention defines a data unit to be handled to facilitate editing.

The microcomputer block 30 has a main control unit 31 including, for example, the MPU (micro processing unit) or CPU (central processing unit) 31a; a ROM (read only memory) 31b retaining a control program to operate the MPU (CPU) 31a, various elements of the picture recording apparatus 1, control blocks and the like; and a RAM (random access memory) 31c which provides a predetermined work area to be secured to execute the program. It should be appreciated that the work RAM 31c may be built as firmware of the MPU, for example.

The microcomputer block 30 follows the control program stored in the ROM 31b and performed by the MPU (CPU) 31a, using the RAM 31c as the work area. For example, defective place detection, unrecorded area detection, position setting for information to be recorded, UDF recording or AV address setting are executed.

Furthermore, the microcomputer block 30 includes a directory detection unit 32, and also includes a VMG information (overall video management information) creation section, a copy—(duplication—) related information detection section, a copy (duplication)/scrambling information processing section (RDI processing section), a packet header processing section, a sequence header processing section, an aspect ratio information processing section, and the like, which are not described in detail. The microcomputer block 30 includes a management information control section (hereinafter referred to as a recording management/control section) 33 used during recording to record (video-record) information (data), and a management information control section (hereinafter referred to as an edit management/control section) 34 used during editing to edit recorded data. Means characterized by the present invention is in a form of the control program, and executed by the control section 34 for management information when editing is performed and by the control section 33 for management information when the video recording is performed.

Out of contents of execution results of the MPU (CPU) 31a, those that a user should be informed of are displayed on-screen (OSD) on a display unit 43 of the picture recording apparatus 1 or on a monitor device (described later and connected as an external device).

Furthermore, the microcomputer block 30 has a key input unit 44 which makes it possible to input (to the microcomputer block 30) control signals from the user to operate the apparatus 1, that is, operation signals. The key input unit 44 corresponds to operation switches provided at predetermined positions of the picture recording apparatus 1, and an unshown remote control device capable of inputting the operation signals via an unshown remote control receiving unit. It is to be noted that the key input unit 44 may be a personal computer which can input the control signals to the recording/reproducing apparatus 1 in a wired, wireless or optical (including infrared rays) manner. That is, in any form of the key input unit 44, the user operates the key input unit 44 to record the input video/audio signals, reproduce recorded contents or edit the recorded contents.

It is to be noted that at times based on time data from a system time clock (STC) 38, the microcomputer block 30 controls the disk drive unit 1001, the HDD 2001, the data processor unit 101, the encoder unit 50, the decoder unit 60, etc. Recording and reproducing operations are generally executed synchronously with a time clock from the STC 38. However, processing other than those operations may be performed at times independent of the STC 38.

Although not described in detail, the decoder unit 60 includes a separator which separates and extracts the packs from pack-structured signals in a DVD format, a memory used in the separation of the packs and in other signal processing, a V-decoder which decodes main picture data (contents of the video pack) separated by the separator, an SP-decoder which decodes sub picture data (contents of the sub picture pack) separated by the separator, an A-decoder which decodes audio data (contents of the audio pack) separated by the separator, etc.

Furthermore, the decoder unit 60 includes a video processor which synthesizes the decoded sub picture with decoded main picture at a predetermined time and which outputs, a menu, a highlight button, a caption (character display of voice) and other sub pictures so that they are superimposed (on the main picture).

An output video signal of the decoder unit 60 is input to the video mixing (V-mixing) unit 71. The V-mixing unit 71 synthesizes text data with the main picture (in which the sub pictures are mixed). It is to be noted that to the V-mixing unit 71, a line is also connected to which signals from the TV tuner 42 and the A/V input unit 41 can be directly input.

There are also connected, to the V-mixing unit 71, a frame memory 72 used as a buffer, an interface (I/F) 73 used to output analog signals in outputting output signals from the V-mixing unit 71, a digital-to-analog converter (D/A converter) 74 used to output digital signals.

An audio signal (an output) output from the decoder unit 60 is input to a digital-to-analog converter (D/A converter) 77 through the selector 76, and converted into an analog form by the D/A converter 77 and output to the outside. For example, when a speaker is connected to an output terminal of the D/A converter 77 via an unshown amplifier, the user can listen (to a sound). It is to be noted that the selector 76 is controlled by a select signal from the microcomputer block 30. Thus, the selector 76 can supply, directly to the D/A converter 77, the digital signals that have passed through the encoder unit 50 among the digital signals (not necessary to be processed by the encoder unit) from the TV tuner 42 and the A/V input unit 41.

It is to be noted that various kinds of cut information are created during recording of data (video recording) in the formatter 51 of the encoder unit 50, and those are periodically sent to the MPU (CPU) 31a in the microcomputer block 30 (information on, for example, interruption to a GOP head). The cut information includes the number of packs of a VOBU, an end address of an I-picture from a VOBU head, reproduction time of the VOBU, etc.

From the formatter 51, the MPU (CPU) 31a is supplied with aspect ratio information from the aspect information processing section at the start of recording. On the basis of this information, the MPU (CPU) 31a creates VOB stream information (STI). The STI includes resolution data, aspect data and the like, and initial setting is performed during reproduction in each of the decoder units.

It is to be noted that in the picture recording apparatus 1, one video file is assigned to one disk. Further, an information unit (size) that "continues at the minimum size" is determined to prevent breaking of an image being reproduced while data is accessed (sought). This unit is referred to as a contiguous data area (CDA). The CDA size is a multiple of an error correction code (ECC) block (16 sectors), and recording is performed on this CDA unit in the file system.

The data processor unit 101 receives data in the VOBU unit from the formatter 51 of the encoder unit 50, and supplies data in the CDA unit to the disk drive unit 1001 or the HDD 2001. Further, the MPU (CPU) 31a of the microcomputer block 30 creates management information necessary to reproduce the recorded data, and when recognizing a data recording termination command indicating that the data recording has been terminated, the MPU (CPU) 31a sends the created management information to the data processor unit 101.

Thus, the management information is recorded on the recording medium (the optical disk M or the hard disk HD). Therefore, during encoding, the MPU (CPU) 31a can receive information (such as the cut information) in the data unit from the encoder unit 50. Also, at the start of recording, the MPU (CPU) 31a recognizes the management information (file system) read from the optical disk M or the hard disk HD, and recognizes unrecorded areas of the disks, thereby setting recording areas on data into the disks via the data processor unit 101.

Figure 2:
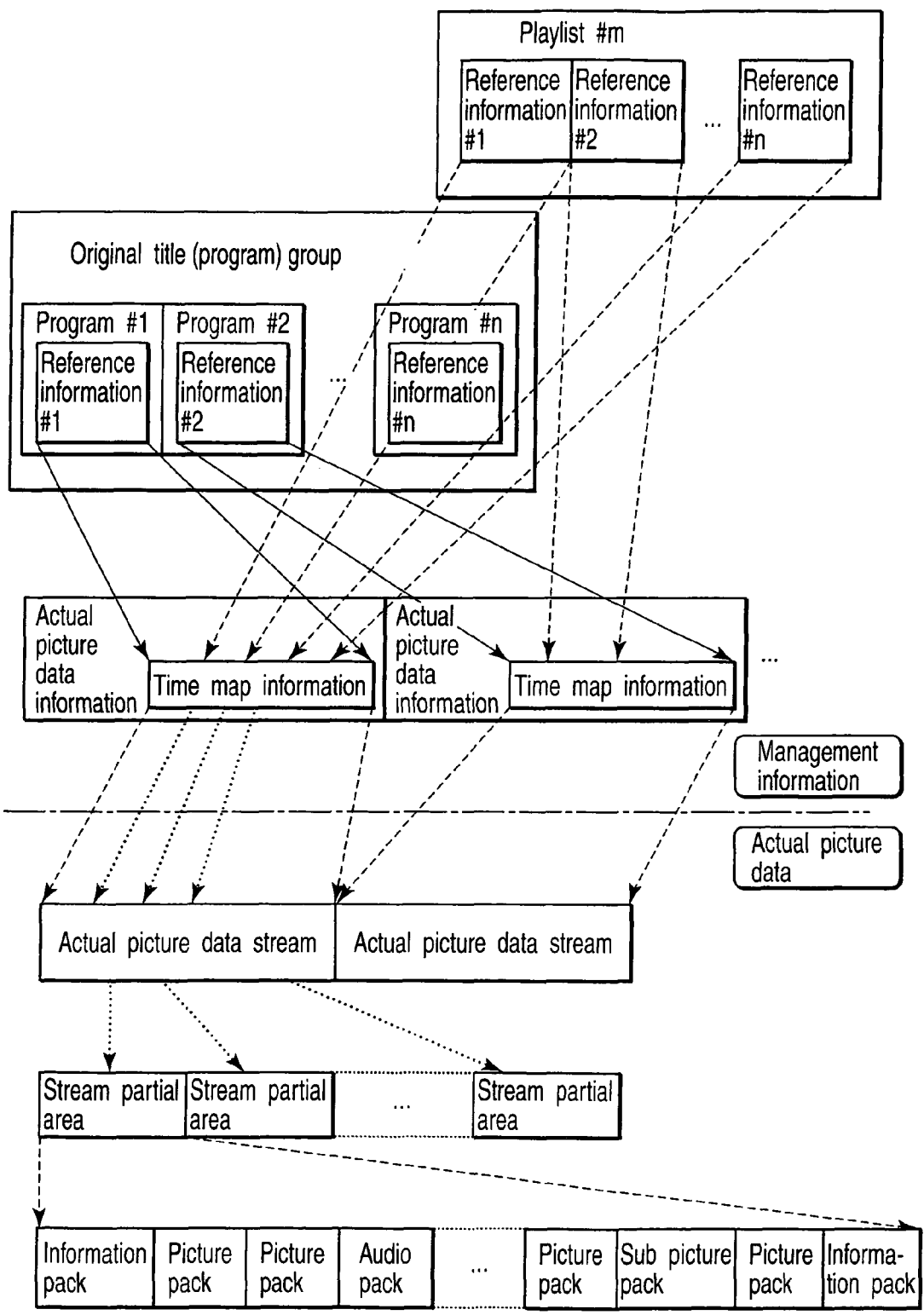
FIG. 2 is a schematic diagram explaining a relation between management information and actual picture data in the present invention.

Next, a relation between the management information and actual picture data, which is the content, will be briefly described using FIG. 2.

In FIG. 2, the actual picture data is first explained. Here, it is assumed that the actual picture data is combined into one file on the recording medium. One file includes one or a plurality of actual picture data streams. Each of the actual picture data streams is, for example, one unit that is recorded in recording processing.

This corresponds to, for example, the video object (VOB) in the DVD recording standard. One actual picture data stream includes one or a plurality of stream partial areas. This corresponds to, for example, the video object unit (VOBU) in the DVD recording standard or to a group of pictures (GOP) in the MPEG-2 standard. One stream partial area includes a plurality of packs. The plurality of packs includes, for example, information packs, picture packs and voice packs. It may also include the sub picture pack.

The information pack corresponds to, for example, an RDI pack in the DVD recording standard. In that case, this pack includes information indicating a time to start reproducing a first field of the VOBU to which the pack belongs, information indicating a recording time of the VOBU and manufacturer information (MNFI). It also includes display control information (DCI) and copy control information (CCI). The display control information represents the aspect ratio information, subtitle mode information and film camera mode information. The copy control information includes copy permission information or copy prohibition (non-permission) information.

The picture pack is video data compressed in the MPEG-2 method, and includes a pack header, a packet header and a video data portion.

The voice pack is audio data processed, for example, in a method such as the linear PCM, MPEG or AC-3 method, and includes a pack header, a packet header and an audio data portion.

Next, the management information will be described.

Within the management information, original title (program) information is defined, which is information (reproduction order information) to manage an order of reproducing the actual picture data. This corresponds to, for example, a program in the DVD recording standard.

Reference information is defined in each piece of the original title information (or program information), and this is linked to actual picture data information which is information concerning the actual picture data to be reproduced. They correspond to, for example, a cell and video object information (VOBI) in the DVD recording standard.

Thus, an original title (program) has the information (reproduction order information) to manage the reproducing order and its own actual picture data, and this title is generally created during recording.

On the contrary, there is one that only includes the information (reproduction order information) to manage the reproducing order. This is playlist information, which corresponds to, for example, a playlist in the DVD recording standard. This playlist information does not have its own actual picture data, and is created as the playlist by editing (deleting, adding) the reference information linked to the actual picture data information of the original title as shown in FIG. 2.

Time map information is described in the actual picture data information. This time map information specifies partial areas constituting the actual picture data stream corresponding to the actual picture data information. Linking from the original title information for the management information or from the reference information for the playlist information to the actual picture data information is designated by a logical address. Further, linking from the time map information to the actual picture data stream and its partial area is performed on the basis of the number of the actual picture data stream, the number of partial areas in that stream, entry numbers for the individual partial areas and logical addresses to the individual partial areas. Such a configuration can handle ordinary reproduction of the recorded picture data, special reproduction such as double-speed/slow-motion reproduction, and a search for a scene.

While an operation of the present invention will hereinafter be described using the drawings from FIG. 3, the picture recording apparatus in the present invention have the following configuration in the description below.

First, it is assumed that the picture recording apparatus according to the present invention is a DVD recording apparatus based on the DVD recording standard (DVD VR standard). In this case, recording is performed on a DVD in a data format called the DVD VR format. In addition, it is assumed that the picture recording apparatus according to the present invention also has a function to record on the DVD on the basis of the DVD video standard. In this case, recording is performed on the DVD in a data format called the DVD video format.

Furthermore, in the picture recording apparatus according to the present invention, it is possible to use not only the rewritable DVD-RAM and DVD-RW, but also a DVD-R which is a write-once medium. The format in which recording is implemented on the DVD is not uniquely fixed for each kind of DVD, and, for example, recording can be performed on the DVD-R in any one of the DVD VR format and the DVD video format.

Still further, in the following description, it is assumed that the picture recording apparatus in the present invention is a hybrid recorder having two recording media including the DVD and the HDD as shown in a block diagram of FIG. 1 described above, and that picture information can be copied between the DVD and the HDD. However, contents of the present invention are not exclusively applied to the hybrid recorder, and can also be applied to a recorder solely equipped with a function only to record on the DVD.

Further yet, in the picture recording apparatus according to the present invention, the partial area in a recorded title is called a chapter. For example, when recording is performed in the DVD VR format, the chapter uses, as a mark of its boundary, an entry point (EP) defined in the DVD VR standard and set in the title. That is, a zone located between the EPs set in the title is called the chapter. It is to be noted that a start point and an end point of the title are the boundaries of the chapter regardless of whether or not there is the EP. Therefore, in a first chapter of the title, the EP may not be present at its start point.

Figure 3:
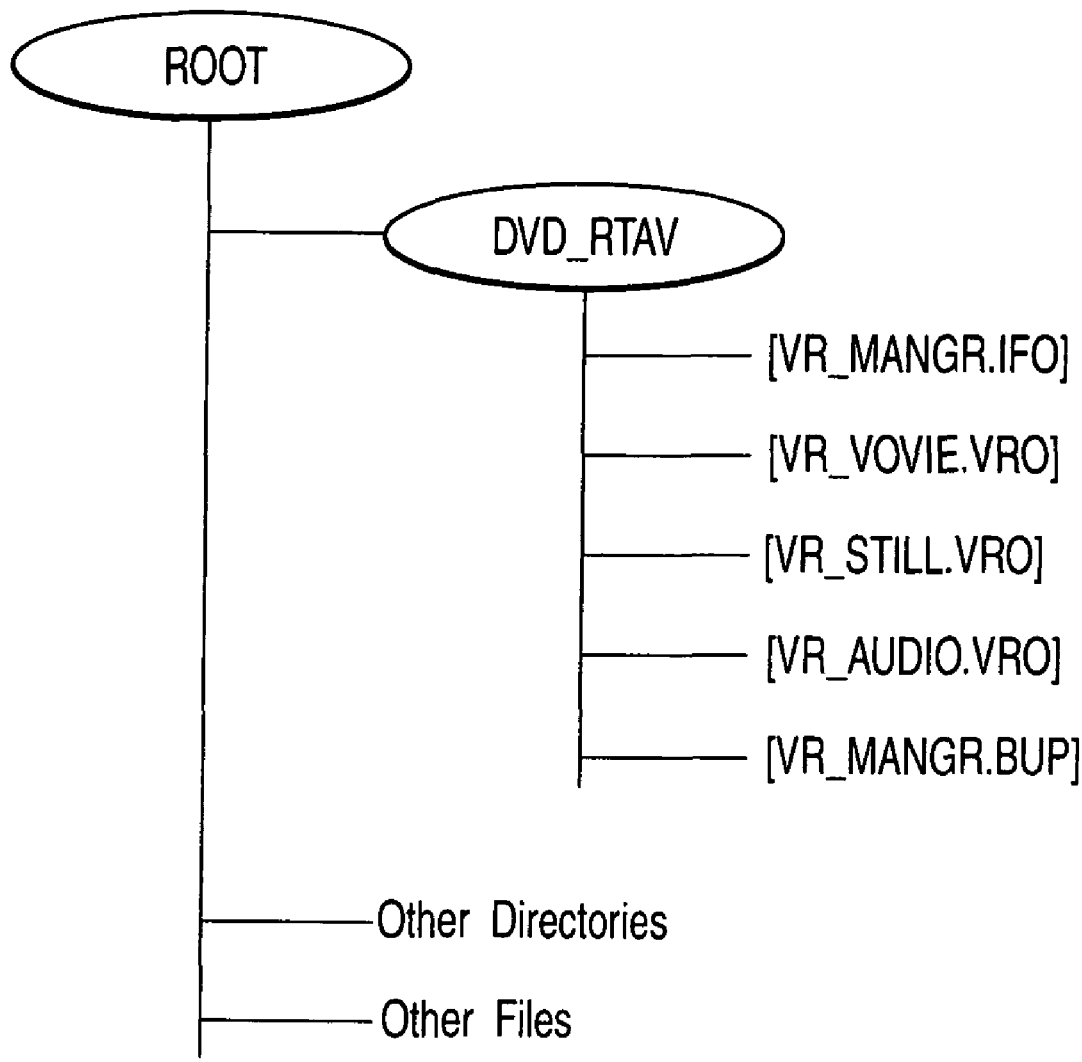
FIG. 3 is a schematic diagram showing, by way of example, configurations of directories and files defined in a DVD recording standard (DVD VR standard)

FIG. 3 is a schematic diagram showing configurations of directories and files defined in the DVD recording standard (DVD VR standard). In FIG. 3, the directories and files defined by Ver 1.1 of the DVD VR standard are shown.

In the Ver 1.1 of the DVD VR standard, a subdirectory called DVD_RTAV is provided under a root directory, and the files defined by the standard are placed under this DVD_RTAV. That is, there are only five kinds of files shown in FIG. 3 under the DVD_RTAV. The individual files will be described below.

First, VR_MANGR. IFO is navigation data for the original title (program) and the playlist. This corresponds to the management information shown in FIG. 2 described above. The playlist, the entry point (EP) and the like are described in this VR_MANGR. IFO. The description in this VR_MANGR. IFO can be changed to perform edit processing, for example, deletion of unnecessary scenes without directly processing the picture data. Therefore, when chapter creation or edit processing such as playlist editing is performed, this VR_MANGR. IFO will mainly be targeted for processing.

Furthermore, the time map information for the actual picture data is written into the VR_MANGR. IFO in conjunction with recording. Information associated with the entire disk is also written into the VR_MANGR. IFO, and it is thus written immediately when the DVD is initialized.

VR_MANGR. BUP is a backup file of the VR_MANGR. IFO. This VR_MANGR. BUP is optional in the standard, and does not always have to be present. If the VR_MANGR. BUP is used, contents of its files have to be the same as those of the VR_MANGR. IFO.

On the other hand, VR_MOVIE. VRO is an AV (audiovisual) data file of a recorded moving image, and corresponds to the actual picture data in FIG. 2 described above. This contains, in a multiplexed form, the packed picture data and audio data, and the sub picture data when supported.

A VR_STILL. VRO file is an AV data file of a still image, and corresponds to the actual picture data in FIG. 2 described above similarly to the VR_MOVIE. VRO. This contains the packed picture data, and the audio data and the sub picture data may optionally be multiplexed therein.

Furthermore, a VR_AUDIO. VRO file is a data file containing after-recording audio information for the still image placed in the VR_STILL. VRO.

The VR_MOVIE. VRO, VR_STILL. VRO and VR_AUDIO. VRO files are not present at the time when the DVD is initialized, and these are created when recording is actually implemented, in which the picture data and the audio data are recorded. It is to be noted that these three kinds of files are not necessarily present, and that the VR_STILL. VRO and VR_AUDIO. VRO files need not be present, for example, in the picture recording apparatus which does not have a recording function of still images or after-recording function.

Those are the files defined in the Ver 1.1 of the DVD VR standard, but in addition, original information files of that picture recording apparatus can also be created in order to improve operability of the picture recording apparatus and to add functions thereto. In that case, those original information files must not be placed under the DVD_RTAV, and must be placed immediately under the root directory or under an original directory created under the root directory.

Figure 4:
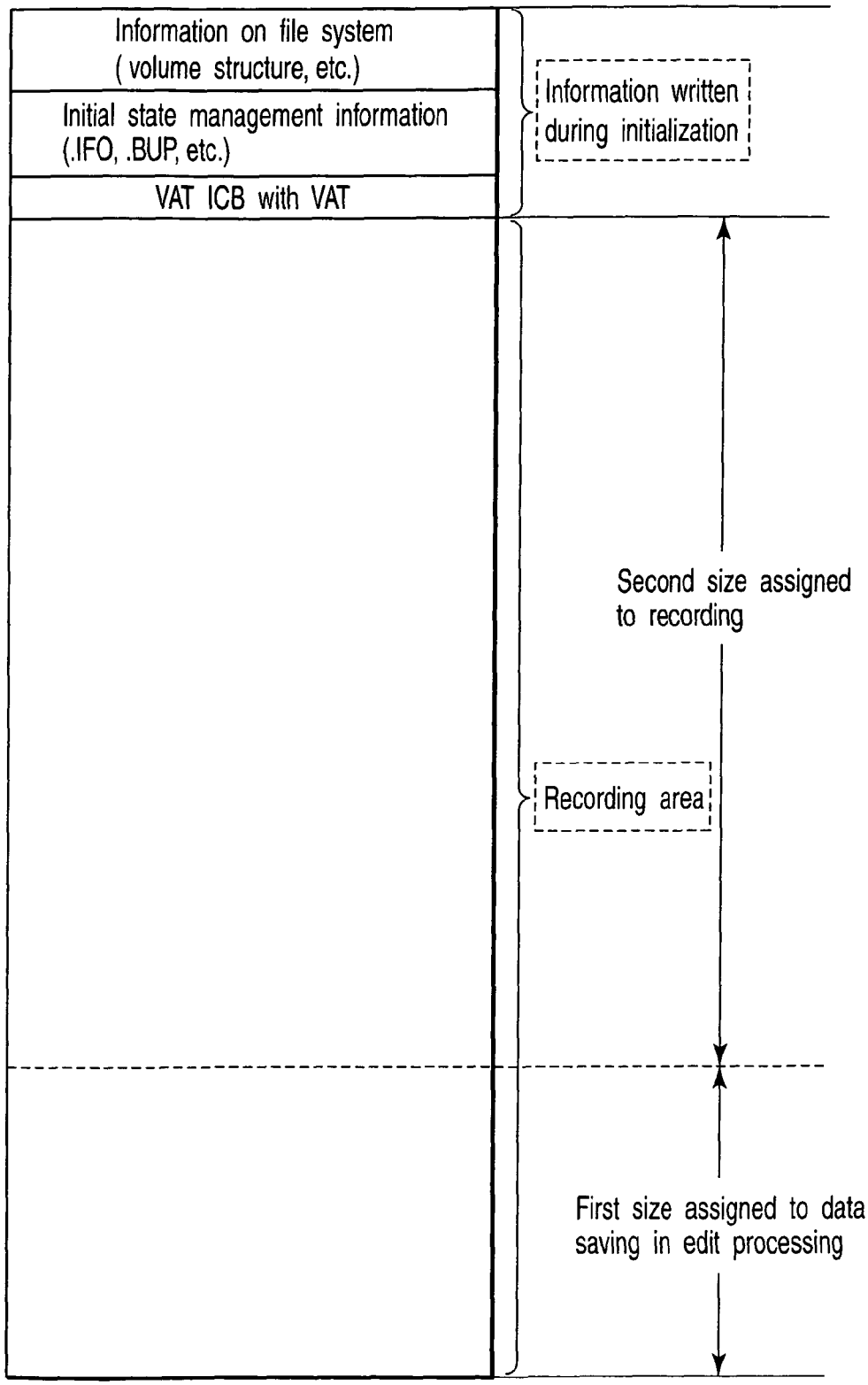
FIG. 4 is a schematic diagram virtually representing a recording area of a DVD-R which is a write-once medium.

FIG. 4 is a diagram representing an image of the recording area of the DVD-R which is the write-once medium. FIG. 4 represents an initial state of the disk on which recording is performed on the basis of the DVD recording standard (DVD VR standard).

When the disk is initialized, information on the file system such as a volume structure in a universal disk format (UDF), the initial state management information and the like are written. This management information may include information ranked as the management information among the original information files of the picture recording apparatus, in addition to the management information defined in the DVD VR standard such as the VR_MANGR. IFO and the VR_MANGR. BUP described above with FIG. 3.

In a case of the rewritable DVD-RAM and DVD-RW media, target data can be updated and then written back into the disk when recorded contents are changed by the edit processing. Contrarily, in the write-once medium such as the DVD-R, when the recorded contents in the disk have been changed, data needs to be newly re-recorded in the unrecorded area of the disk even if a part of a file has been changed. That is, when the edit processing is performed, updated data is not overwritten but incrementally written. In that case, it is necessary to restructure many kinds of management information such as the management information of the file, information on a parent directory linked to that file management information and information on a parent directory of that parent directory, and this is quite inefficient if nothing is changed.

To reduce such inefficiency, a special address conversion table called a virtual allocation table (VAT) is used in accordance with a UDF standard when incremental-write recording is performed on the DVD-R. The use of this table only necessitates recording the changed data and the VAT when recorded contents of the disk are changed, so that it is not necessary to totally change and incrementally write a tremendous amount of data such as information on the linked parent directory. In FIG. 4, after the initial state management information is recorded, the VAT at that point and VAT ICB to identify the VAT are written.

A remaining area after the information written during the initialization is subtracted is the recording area that can be used for recording and for the incremental writing of data in the edit processing. The present invention is characterized in that there are provided, in this recording area, a first data size assigned to data saving in the edit processing and a second data size assigned to recording. It is to be noted that FIG. 4 shows an image of the data sizes assigned to recording and editing, which does not mean separation of the data recording area for recording and editing. This can be understood by referring to an image diagram in which data is incrementally written into the recording area by recording and editing, and this will be described later using the drawings from FIG. 10. The remaining capacity can be known by detecting, for example, bit map information recorded in the file system and indicating recorded states of physical sectors or logical sectors, or detecting the logical address regarded as an address used in the management information.

Figure 5:
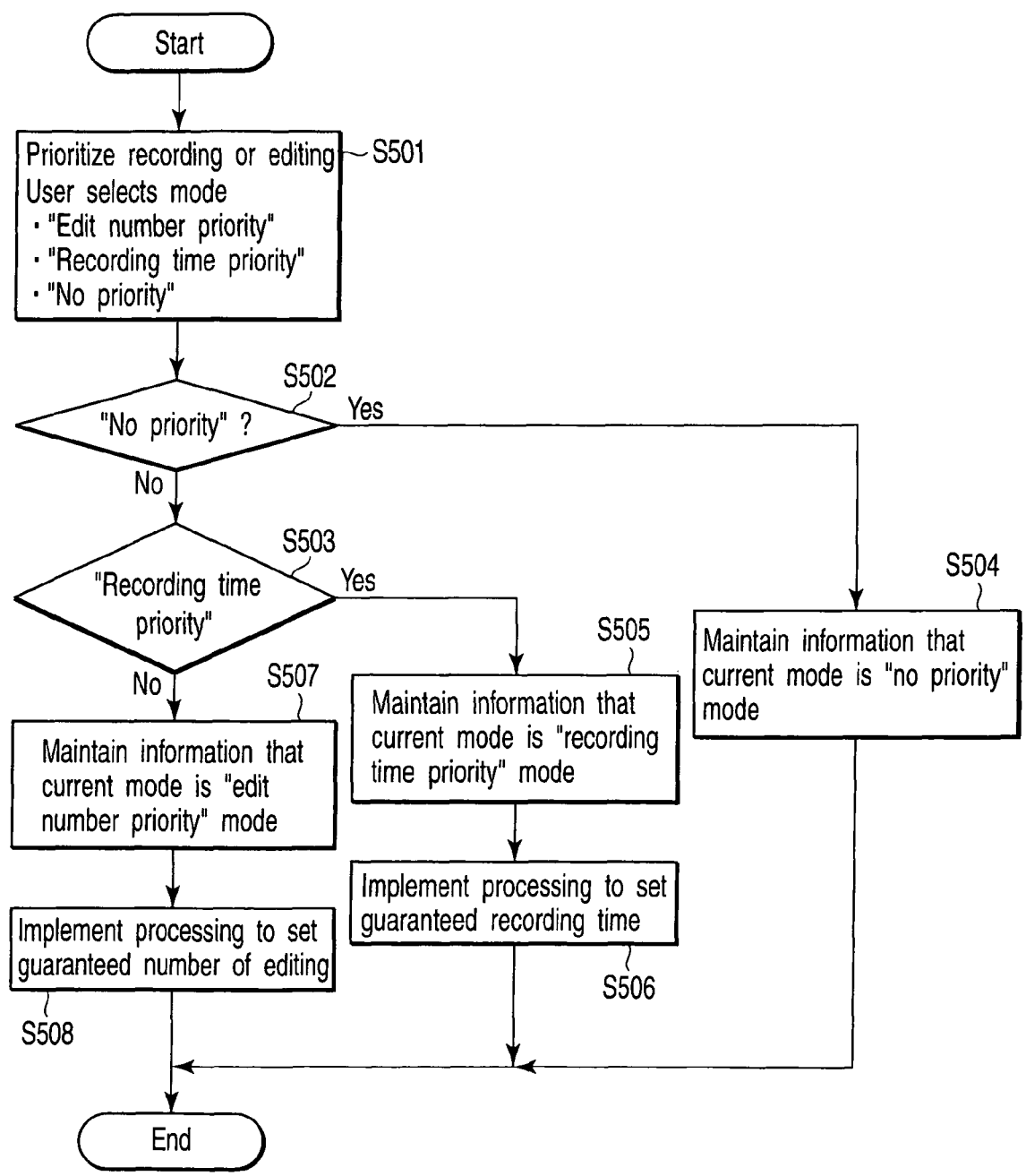
FIG. 5 is a flowchart for mode setting processing in recording and editing.

FIG. 5 is a flowchart for mode setting processing in recording and editing when recording is performed on the DVD-R on the basis of the DVD recording standard (DVD VR standard). FIG. 5 shows a flow of processing to give priority to one of recording and edit modes when recording is performed on the DVD-R.

Here, it is assumed that there are three kinds of modes: an "edit number priority" mode, a "recording time priority" mode and a "no priority" mode. The "edit number priority" mode is a mode to secure the minimum desired number of edit processing to be implemented even when long-time recording, recording of a large number of titles or recording at a high encoding rate is performed on the DVD-R in the DVD VR format. In this case, the data size assigned to the data saving in the edit processing is secured above all, and this therefore determines the data size which can be used for recording.

On the other hand, the "recording time priority" mode is a mode to secure time which ensures that recording can be performed at a certain encoding rate, for example, when a description on a package of a medium says "about two-hour recording possible in normal mode". In this case, the data size assigned to recording is secured above all, and this therefore determines the data size which can be used for the data saving in the edit processing. In addition, the "no priority" mode is a mode in which neither recording nor editing is particularly given priority.

The flow of processing shown in the flowchart of FIG. 5 will be described below. First, at step S501, one of the "edit number priority" mode, the "recording time priority" mode and the "no priority" mode is selected by an operation of the user. At that point, the user performs the selection operation using the key input unit 44 of FIG. 1 while referring to an operation screen displayed on-screen on the display unit 43 shown in a block diagram of FIG. 1 described above or on a monitor display.

Next, at step S502, whether the selected mode is the "no priority" mode or other modes is judged, thereby branching the processing. The "no priority" mode is brought to step S504, while the other modes are brought to step S503.

At step S504 reached in the case of the "no priority" mode, a series of processing is terminated maintaining information that the current mode is the "no priority" mode. The maintenance of the information on the current mode will be described later.

On the other hand, at step S503, it is judged whether the mode regarded as a mode other than the "no priority" mode is the "recording time priority" mode or still another mode, that is, the "edit number priority" mode, thereby branching the processing. The "recording time priority" mode is brought to step S505, while the "edit number priority" mode is brought to step S507.

Step S505 reached in the case of "recording time priority" mode leads to next step S506 maintaining information that the current mode is "recording time priority" mode. The maintenance of the information on the current mode will be described later.

At subsequent step S506, a guaranteed recording time is set by the user operation, and then the series of processing is terminated. Details of the processing at step S506 will be described later using FIG. 7.

In the meantime, step S507 reached in the case of the "edit number priority" mode leads to next step S508 maintaining information that the current mode is the "edit number priority" mode. The maintenance of the information on the current mode will be described later.

At subsequent step S508, the guaranteed number of editing is set by the user operation, and then the series of processing is terminated. Details of the processing at step S508 will be described later using FIG. 6.

For the aforementioned maintenance of the current mode information which has been set, the following measures can be taken. For example, a measure can be taken wherein the mode information is recorded on each DVD-R as a part of original information of the picture recording apparatus. Another measure can be taken, for example, wherein the mode information is maintained on the picture recording apparatus. In some cases, the picture recording apparatus has a function to identify a disk on the basis of ID information unique to each of the disks, and maintain and manage, on that picture recording apparatus, library information regarding the disks on which initialization, recording or editing has been performed in the picture recording apparatus. The mode information for each DVD-R can be maintained as part of the library information on the picture recording apparatus. In that case, it is possible to take a measure wherein a data saving area is provided in a nonvolatile memory or the data saving HDD built in the picture recording apparatus, or on the HDD used for recording in a case of the hybrid recorder comprising both the DVD and HDD, so that the mode information is recorded therein.

It is to be noted that no limit to set "the mode information" by the user operation, default mode information can also be set and maintained. The default mode information can be maintained by the same means as that for the mode information set by the user operation, and can also be separately maintained on a main unit of the picture recording apparatus, for example, on the nonvolatile memory built in the apparatus.

Figure 6:
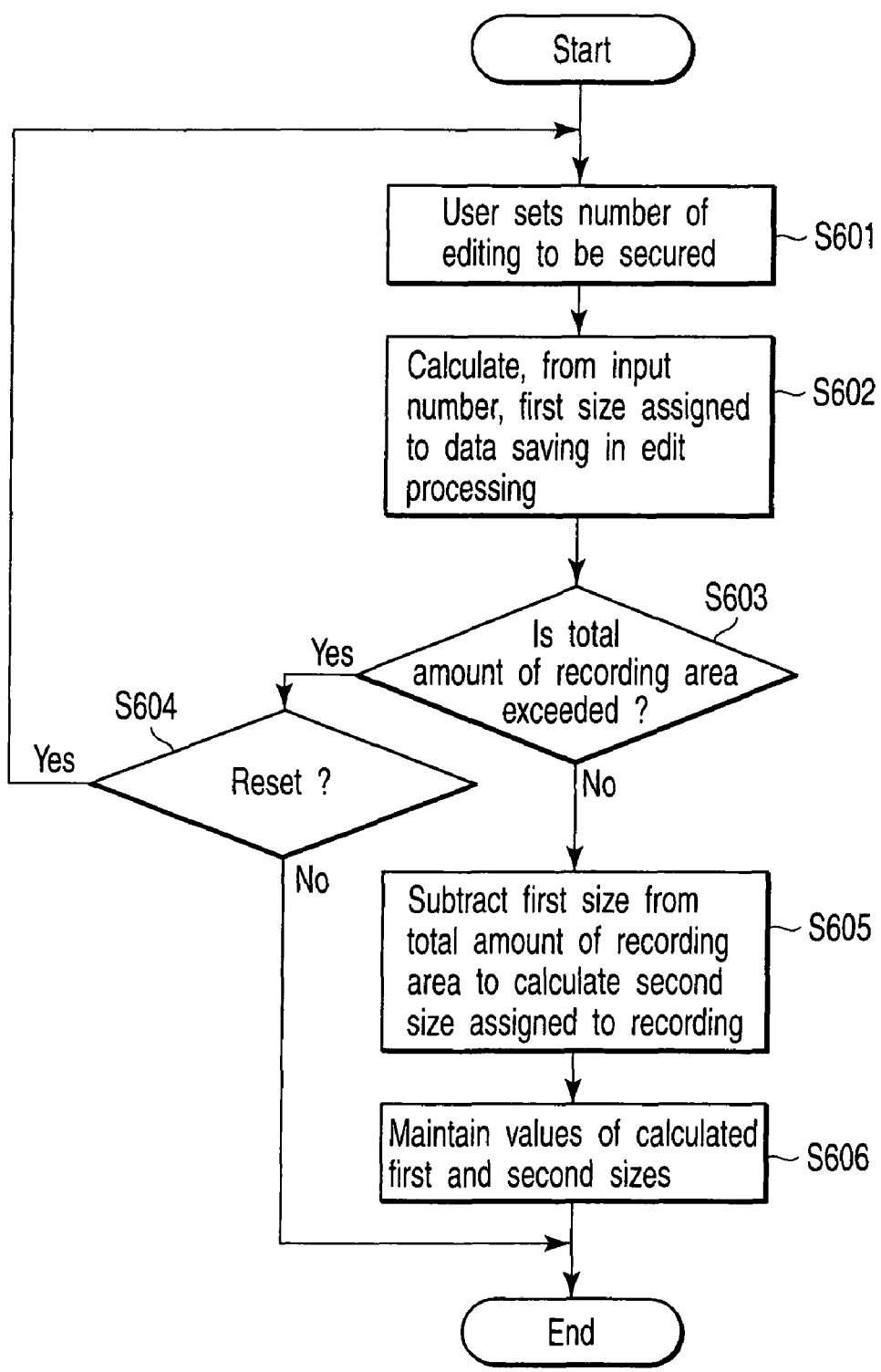
FIG. 6 is a flowchart for detailed processing to set the guaranteed number of editing.

FIG. 6 is a flowchart for detailed processing to set the guaranteed number of editing by the user operation. This is a detailed description of the processing at step S508 in FIG. 5 described above.

First, at step S601, the number of editing to be secured is set by the user operation. For example, when recording has been performed on the disk to the extent that further recording is impossible and the edit processing is still desired to be performed, for example, at least 20 times, the number of times "20" is set here. At that point, the user performs the setting operation using the key input unit 44 of FIG. 1 while referring to the operation screen displayed on-screen on the display unit 43 shown in the block diagram of FIG. 1 described above or on the monitor display.

Next, at step S602, the first size assigned to the data saving in the edit processing is calculated in accordance with the input number of editing to be implemented. As described above, in the disk on which recording has been performed in the DVD VR format, a target for the edit processing is mainly the VR_MANGR. IFO which is the management information. (The VR_MANGR. BUP is a copy of the content of the VR_MANGR. IFO.) Further, in some picture recording apparatuses, original information files may also be targeted for editing. While an amount of data which will be incrementally written anew in one edit operation varies depending on a model or a manufacturer due to a specification (such as a configuration of the original information files) of the picture recording apparatus, the amount can be fixed to a certain value on the same picture recording apparatus. Thus, the number of editing can be multiplied by this value to calculate the first size assigned to the data saving in the edit processing.

Subsequently, at step S603, a total amount of recording area on the DVD-R is obtained and compared with the calculated first size, so that whether the calculated first size exceeds the total amount of recording area is judged, thereby branching the processing. If the set number of editing is too large, a value greater than the total amount of recording area on the DVD-R at that point may be calculated as the first size. This is highly possible particularly if a switch is made halfway to the "edit number priority" mode in the DVD-R already used for recording. If the calculated first size has exceeded the total amount of recording area on the DVD-R, step S604 will follow. On the other hand, if it has not exceeded the total amount, step S605 will follow.

At step S604, the user is informed of the fact that the calculated first size has exceeded the total amount of recording area on the DVD-R, and the user is caused to select whether or not to set once again the number of editing to be secured. If the user selects to set it again, a return is made to step S601, and the processing from step S601 is again implemented. If the user selects not to set it again, the series of processing is terminated.

On the other hand, at step S605, the calculated first size assigned to the data saving in the edit processing is subtracted from the total amount of recording area at that point to calculate the second size assigned to recording, and then step S606 will follow. In this "edit number priority" mode, recording can be performed with the calculated second size as an upper limit. However, this is the absolute upper limit, and the size that can be used for recording can be lower than this limit when the edit operations are performed more than the secured number of times. This will be described later using FIG. 10 to FIG. 13.

At step S606, values of the calculated first size and second size are maintained, and then the series of processing is terminated. It is to be noted that the measure similar to that for the maintenance of the mode information described above with FIG. 5 can be taken for the maintenance of these calculated values. In fact, it would be appropriate to maintain these values together with the maintenance of the mode information.

Figure 7:
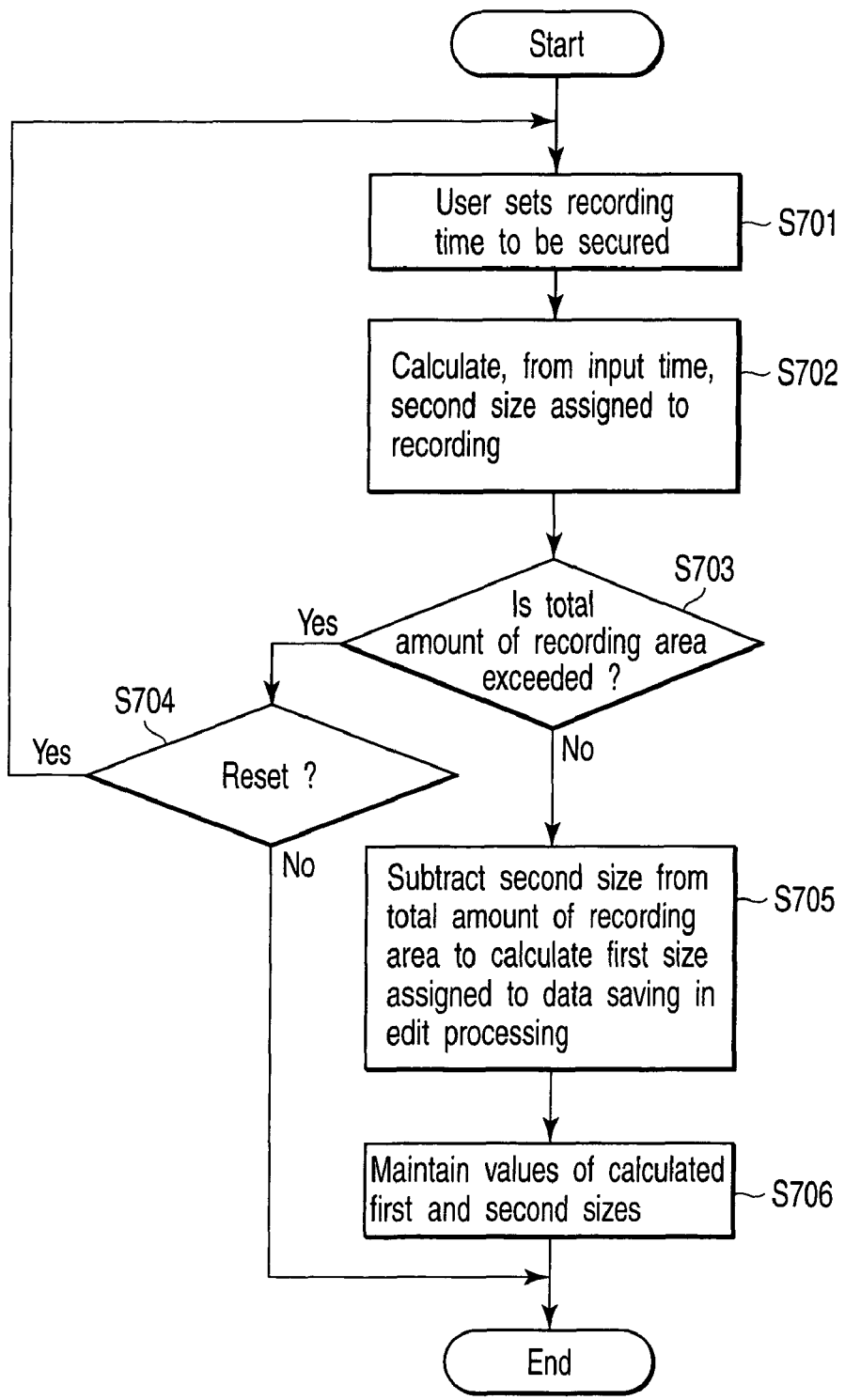
FIG. 7 is a flowchart for detailed processing to set a guaranteed recording time.

FIG. 7 is a detailed flowchart for processing to set the guaranteed recording time by the user operation. This is a detailed description of the processing at step S506 in FIG. 5 described above.

First, at step S701, the recording time to be secured is set by the user operation. For example, when the description on the package of the disk says "about two-hour recording possible in normal mode" and a value corresponding to this catalog specification is desired to be ensured, a recording mode "normal recording mode" and the time "two hours" are set here.

It should be appreciated that the set encoding rate in the recording mode provided in such a form as "normal recording mode", "high-definition recording mode" or "long-time recording mode" is not changed, for example, depending on the specification of the picture recording apparatus or on a designing policy of the manufacturer. In this case, those that vary are not only the encoding rate of a picture signal but also an encoding method (e.g., MPEG audio, Dolby AC-3, LPCM), the encoding rate and the like of the audio signals set in the recording mode. Therefore, while the recording mode is selected in the user operation, the encoding method and the encoding rate are selected inside the apparatus.

Hence, no limit to "the selection of the recording mode", the user may directly set the encoding method and the encoding rate. In any case, at step S701, it is necessary to set, as well as the recording time, parameters required for estimation of an amount of codes generated by recording. In this setting processing, the user performs the setting operation using the key input unit 44 of FIG. 1 while referring to the operation screen displayed on-screen on the display unit 43 shown in the block diagram of FIG. 1 described above or on the monitor display.

Next, at step S702, the second size assigned to recording is calculated in accordance with the set recording time and recording mode (such as the encoding method and the encoding rate). An amount of data generated during recording can be calculated by utilizing processing to stop the recording when the remaining amount of recording area of the medium has reached zero or by employing existing processing used to judge whether or not to perform recording on the basis of the remaining capacity of the medium. Thus, the above-mentioned set parameters can be combined into the existing processing to calculate the second size which can be assigned to recording.

Subsequently, at step S703, the total amount of recording area on the DVD-R is obtained and compared with the calculated second size, so that whether the calculated second size exceeds the total amount of recording area is judged, thereby branching the processing. If the set recording time is too long or if the encoding rate is too high, a value greater than the total amount of recording area on the DVD-R at that point may be calculated as the second size. This is highly possible particularly if a switch is made halfway to the "recording time priority" mode in the DVD-R already used for recording. If the calculated second size has exceeded the total amount of recording area on the DVD-R, step S704 will follow. On the other hand, if it has not exceeded the total amount, step S705 will follow.

At step S704, the user is informed of the fact that the calculated second size has exceeded the total amount of recording area on the DVD-R, and the user is caused to select whether or not to set once again the recording time and recording mode (such as the encoding method and the encoding rate) to be secured. If the user selects to set them again, a return is made to step S701, and the processing from step S701 is again implemented. If the user selects not to set them again, the series of processing is terminated.

On the other hand, at step S705, the calculated second size assigned to recording is subtracted from the total amount of recording area at that point to calculate the first size assigned to the data saving in the edit processing, and then step S706 will follow. In this "recording time priority" mode, the edit processing can be performed with the calculated first size as an upper limit. However, this is the absolute upper limit, and the size that can be used for saving edited data can be lower than this limit when recording is performed longer than the secured time. This will be described later using FIG. 14 to FIG. 16.

At step S706, the values of the calculated first size and second size are maintained, and then the series of processing is terminated. It is to be noted that a measure similar to that for the maintenance of the mode information described above with FIG. 5 can be taken for the maintenance of these calculated values. In fact, it would be appropriate to maintain these values together with the maintenance of the mode information.

Figure 8:
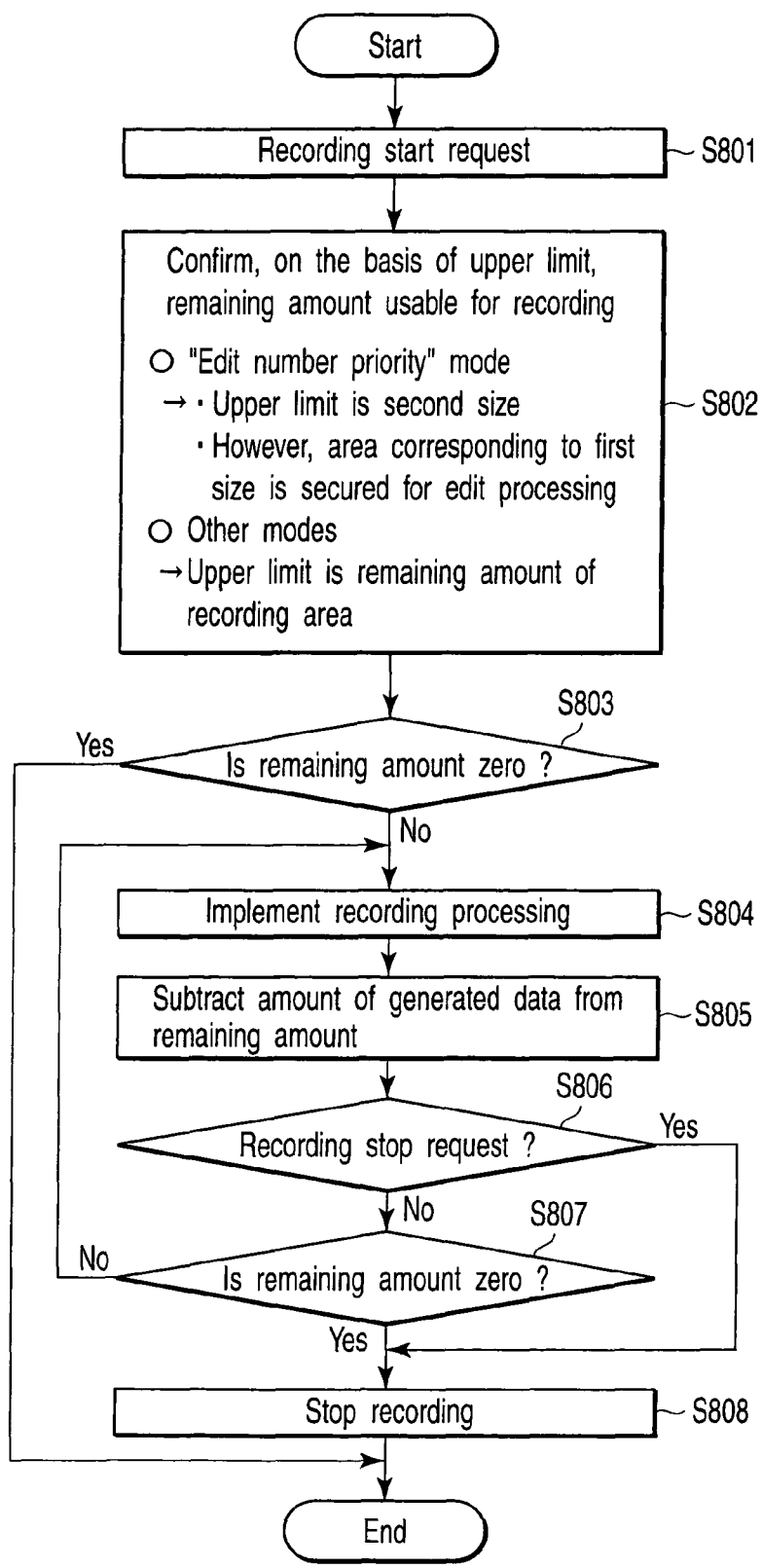
FIG. 8 is a flowchart representing an overview of recording processing in the picture recording apparatus of the present invention.

FIG. 8 is a flowchart representing an overview of recording processing in the picture recording apparatus of the present invention.

First, at step S801, a request to start recording is made. This includes, for example, a manual start of recording by a direct user operation or activation of recording reserved by timer setting.

Next, at step S802, the remaining amount of recording area that can be used for recording is checked. Here, it is necessary to consider the maintained mode information, the maintained first and second sizes, and the remaining amount of recording area on the DVD-R at that point. If the "edit number priority" mode is currently set, the upper limit of the data size that can be used for recording is the second size. However, an amount corresponding to the first size has to be secured for the edit processing even after recording has been fully performed, so that, for example, if a plurality of titles is recorded and the edit processing is performed several times in between, recording may possibly be brought to an end before reaching the second size. Thus, in this "edit number priority" mode, it is necessary to determine whether to continue or stop recording not only after checking whether or not the sum of the amounts of data generated by recording exceeds the second size which is the upper limit but also after checking whether or not the remaining amount of recording area is below the first size. On the other hand, in a case of the "recording time priority" mode and the "no priority" mode, recording can be performed until the remaining amount of recording area is used up.

At subsequent step S803, the remaining amount is checked before recording is actually started, and whether or not there is a remaining amount to perform recording is judged, thereby branching the processing. If the remaining amount which can be used for recording is judged to be zero (including a case where the remaining amount of recording area is below the first size in the "edit number priority" mode), the series of processing is terminated without implementing subsequent recording processing. On the other hand, if the remaining amount which can be used for recording is not zero, step S804 will follow and recording is started.

It is to be noted that the processing in subsequent step S804 to step S807 mainly includes recording and the checking of the remaining amount, wherein the remaining amount is sequentially checked while recording is being performed. Recording and the remaining amount checks are performed in a switched manner in extremely short time units, and these appear to be performed substantially in parallel, from a broad perspective. At step S804, the recording processing is implemented.

Furthermore, at subsequent step S805, the amount of data generated by recording is subtracted from the remaining amount of recording area. Here, the amount of data generated by recording is also subtracted from the second size maintained together.

Next, at step S806, whether or not a request to stop recording has been made is monitored. This includes, for example, a manual stop of recording by a direct user operation, a stop of reserved recording by timer setting, or a halfway stop of reserved recording by the user operation. When it is judged that the request to stop recording has been made, subsequent step S807 is skipped to advance to step S808. When it is judged that the request to stop recording has not been made, step S807 will follow.

At step S807, the remaining amount after subtracting the amount of codes generated by recording at prior step S805 is confirmed, and whether or not there is a remaining amount to continue recording is judged, thereby branching the processing. If the remaining amount is judged to be zero (including the case where the remaining amount of recording area is below the first size in the "edit number priority" mode), subsequent step S808 will follow. On the other hand, if the remaining amount is not zero, step S804 will follow and the processing from step S804 is repeated to continue recording.

At step S808, recording is stopped considering that the remaining amount has become zero or that the request to stop recording has been made, thus terminating the series of processing. Since the amount of data generated by the recording processing so far has been subtracted from the remaining amount of recording area and from the second size by the processing in step S805 described above, the remaining amount of recording area after the subtraction and the value of the second size after the subtraction are maintained, and will be used to evaluate the remaining amount during next recording.

Figure 9:
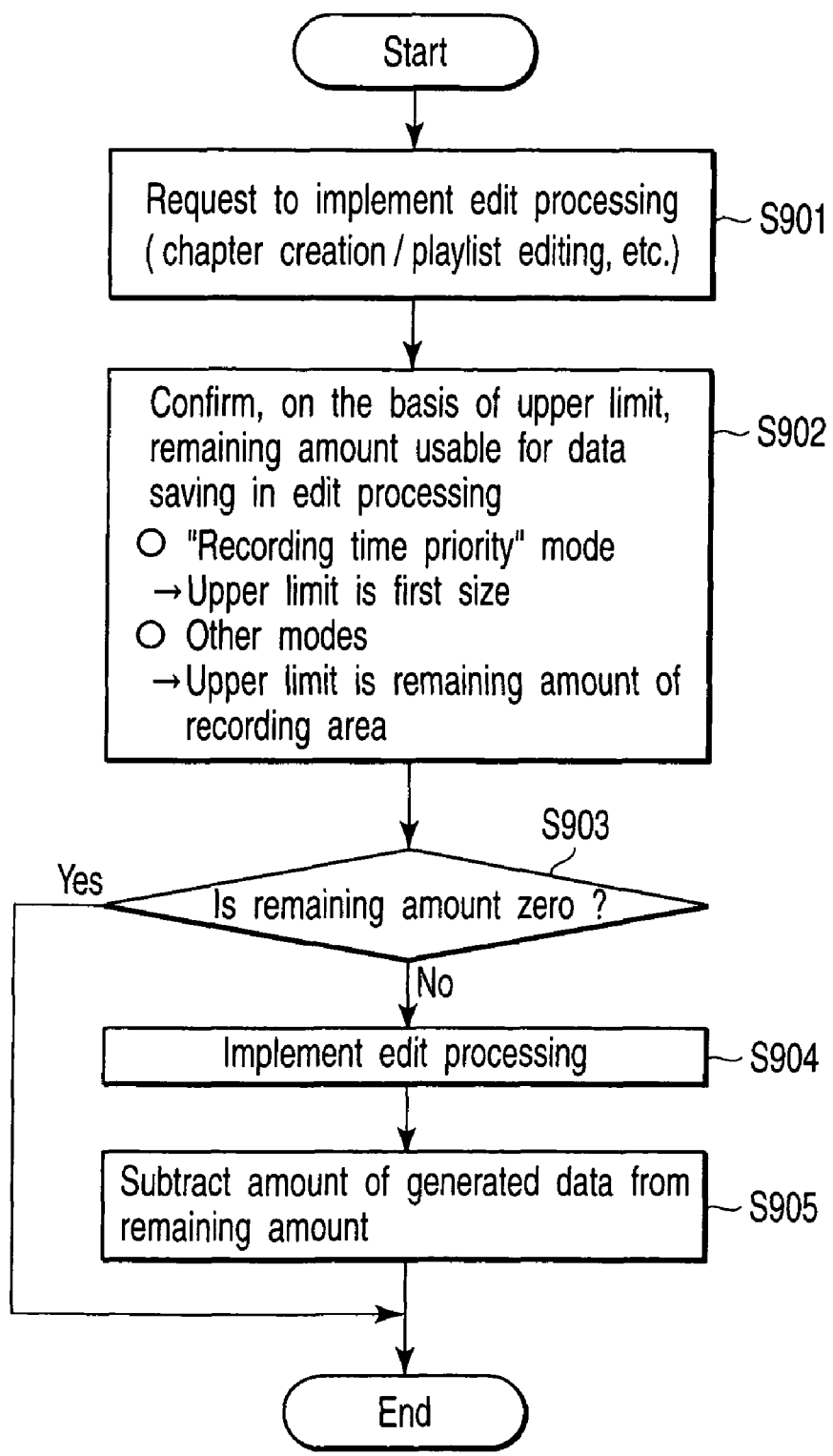
FIG. 9 is a flowchart representing an overview of edit processing in the picture recording apparatus of the present invention.

FIG. 9 is a flowchart representing an overview of the edit processing in the picture recording apparatus of the present invention. First, at step S901, an edit processing implementation request is made. Although details are not shown, the edit processing includes, for example, processing to divide the title such as the program (original title) or the playlist into a plurality of chapters, and processing to collect necessary chapters to build the playlist.

Next, at step S902, the remaining amount of recording area which can be used for the data saving in the edit processing is confirmed. Here, it is necessary to consider the maintained mode information, the maintained first and second sizes, and the remaining amount of recording area on the DVD-R at that point. If the "recording time priority" mode is currently set, the upper limit of the data size that can be used for editing is the first size.

However, the secured recording time is a lower limit value, and recording can be performed beyond this lower limit value, in which case, editing may possibly be brought to an end before reaching the first size. In this "recording time priority" mode, it is necessary to check whether the sum of the amounts of data consumed for the data saving in the edit processing exceeds the first size which is the upper limit value in order to determine whether or not to permit the implementation of the edit processing. On the other hand, in a case of "edit number priority" mode and the "no priority" mode, editing can be performed until the remaining amount of recording area is used up.

At subsequent step S903, the above-mentioned check of the remaining amount is made before implementation of the edit processing, and whether there is a remaining amount to perform editing is judged, thereby branching the processing. If the remaining amount which can be used for editing is judged to be zero, the series of processing is terminated without implementing subsequent edit processing. On the other hand, if the remaining amount which can be used for editing is not zero, step S904 will follow.

At step S904, the requested edit processing is implemented. At next subsequent step S905, the amount of data generated by the edit processing is subtracted from the remaining amount of recording area. Here, the amount of data generated by the edit processing is also subtracted from the first size maintained together. The remaining amount of recording area after the subtraction and the first size after the subtraction are maintained, thus terminating the series of processing. These maintained values will be used to evaluate the remaining amount during next edit processing.

FIG. 10 to FIG. 13 are a series of image diagrams showing changes in the recording area of the DVD-R when the "edit number priority" mode is set.

Figure 10:
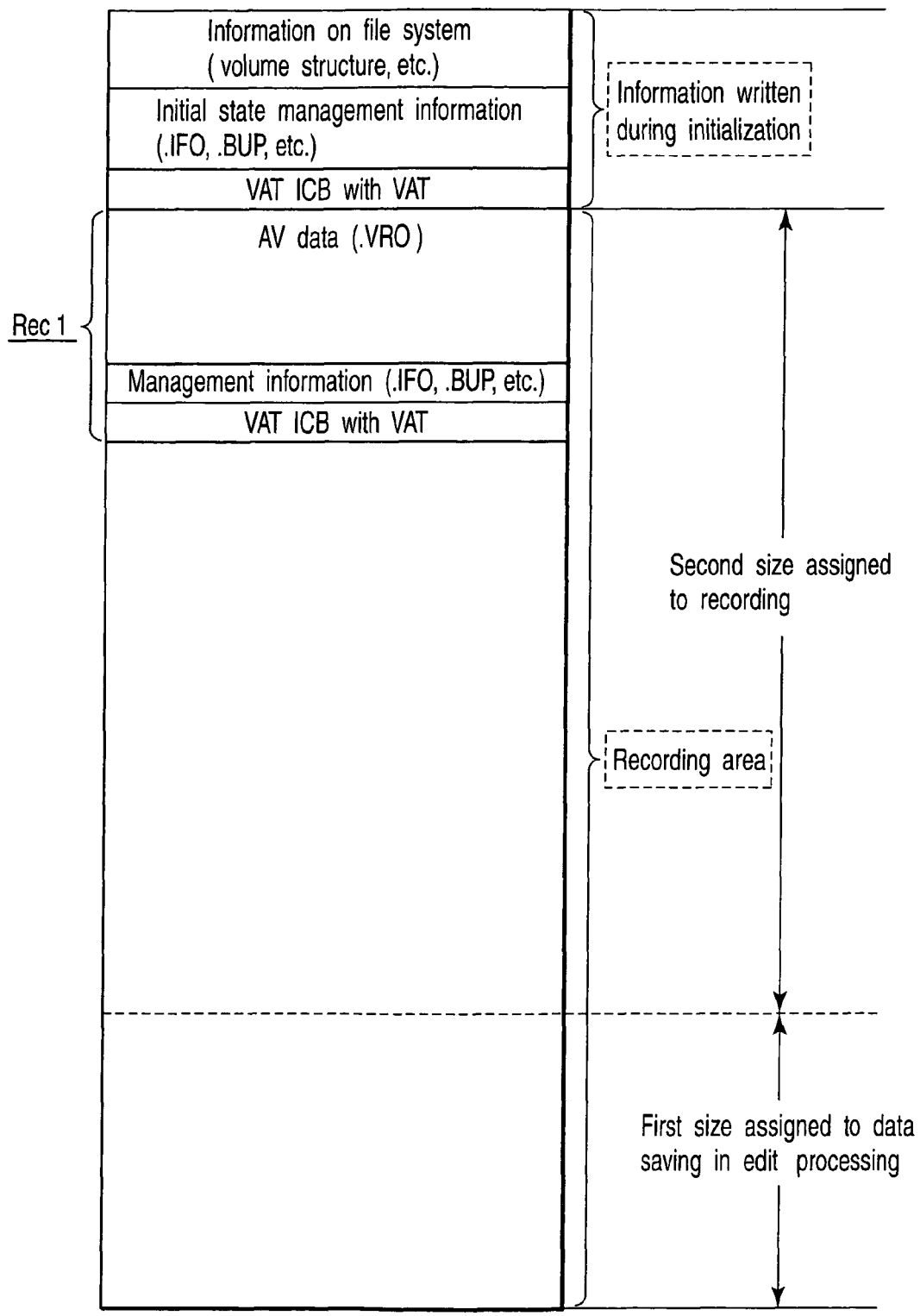
FIG. 10 is a schematic diagram showing a series of images indicating changes in the recording area of the DVD-R when an "edit number priority" mode is set.

First, FIG. 10 shows a state in which one title indicated as "Rec_1" is newly recorded here while a state in FIG. 4 described above is the initial state. In this case, both AV data (VR_MOVIE. VRO) and the management information (such as the VR_MANGR. IFO, VR_MANGR. BUP, original information of the picture recording apparatus) are recorded. Also, there is recorded the VAT ICB with VAT reflecting the recorded content of the disk which has been changed by recording.

Figure 11:
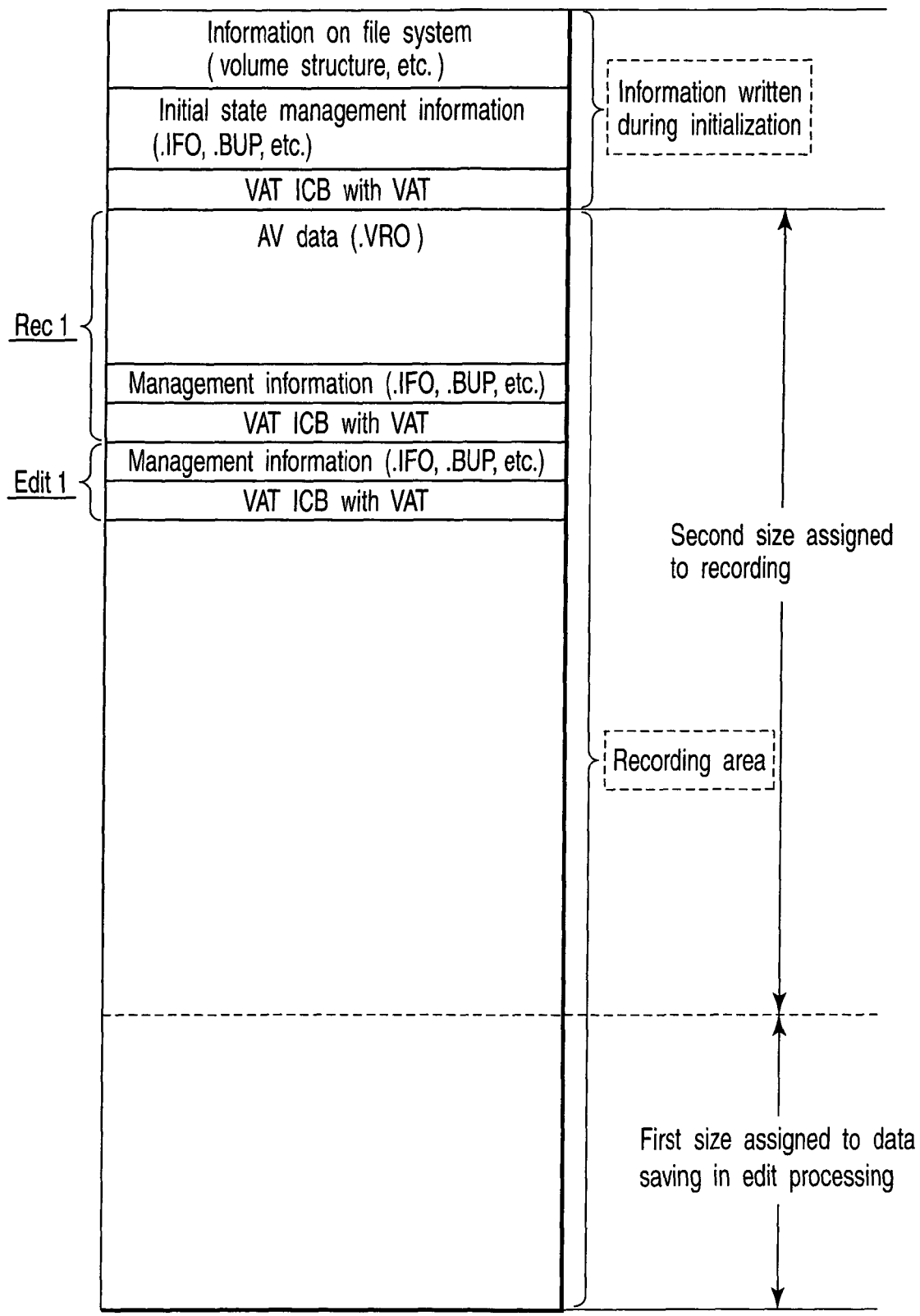
FIG. 11 is a schematic diagram showing a series of images indicating changes in the recording area of the DVD-R when the "edit number priority" mode is set.

Next, FIG. 11 shows a state in which the edit processing is performed one time and in which data indicated as "Edit_1" for that edit processing is saved. In this case, the management information (such as the VR_MANGR. IFO, VR_MANGR. BUP, original information of the picture recording apparatus) is only recorded, and there is further recorded the VAT ICB with VAT reflecting the recorded content of the disk which has been changed by the edit processing.

Figure 12:
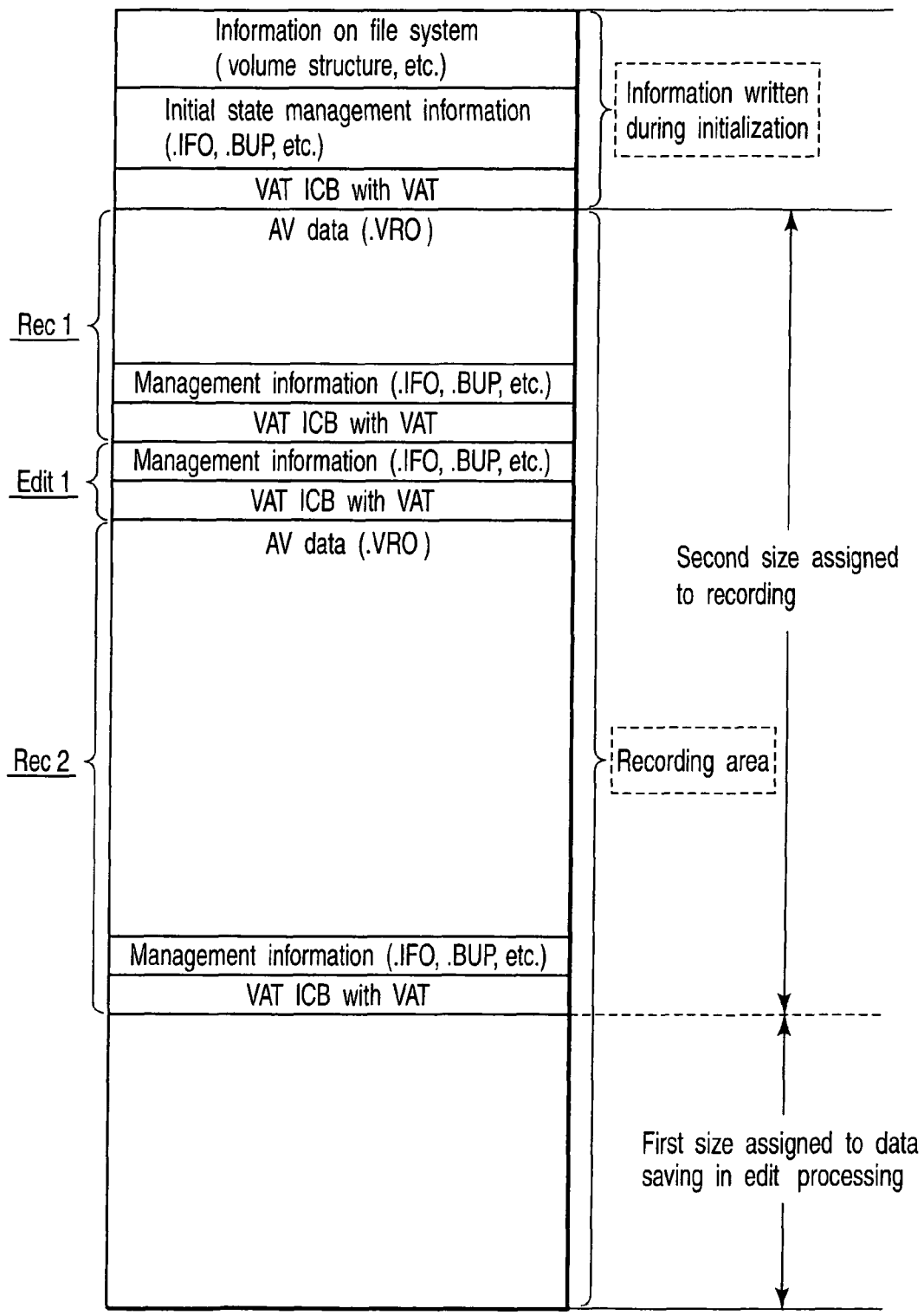
FIG. 12 is a schematic diagram showing a series of images indicating changes in the recording area of the DVD-R when the "edit number priority" mode is set.

Then, FIG. 12 shows a state in which a title indicated as "Rec_2" is recorded. Here, since the "edit number priority" mode is set, the recording area corresponding to the first size has to be secured to enable the edit processing. Therefore, for the title indicated as "Rec_2", recording is stopped at a point where the amount corresponding to the first size remains. Here, if the edit processing indicated by the "Edit_1" is not implemented, the recording area corresponding to the second size can be totally used for recording.

Figure 13:
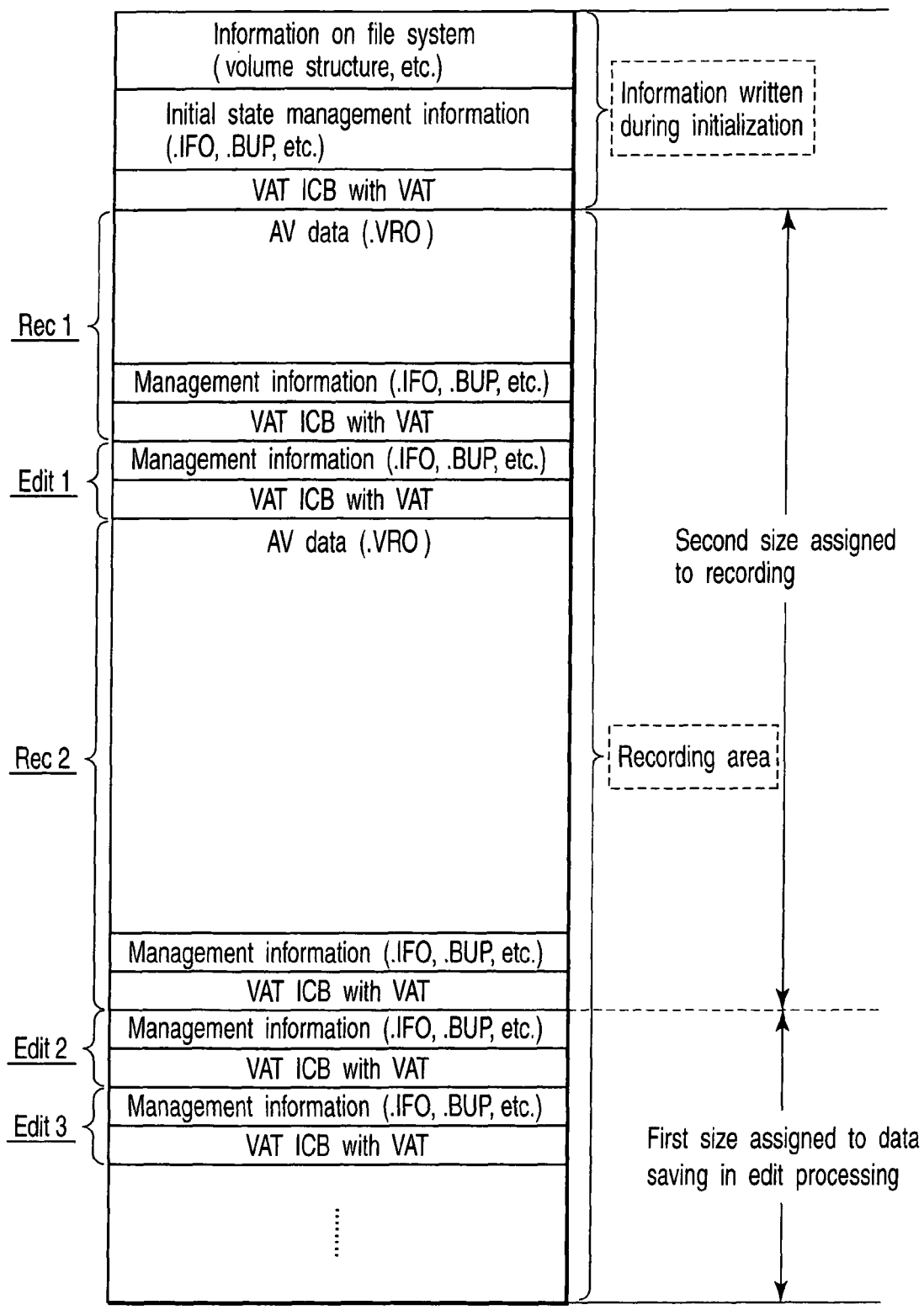
FIG. 13 is a schematic diagram showing a series of images indicating changes in the recording area of the DVD-R when the "edit number priority" mode is set.

Finally, FIG. 13 shows a state in which data for the edit processing indicated as "Edit_2" and "Edit_3" are saved. In this case, no more new titles can be recorded, but because the recording area corresponding to the first size is secured for the edit processing, the edit processing indicated as "Edit_2" and "Edit_3" could be implemented. Subsequently, the edit processing is implemented until the remaining amount of recording area on the DVD-R reaches zero, and data reflecting its content can be saved.

Figure 14:
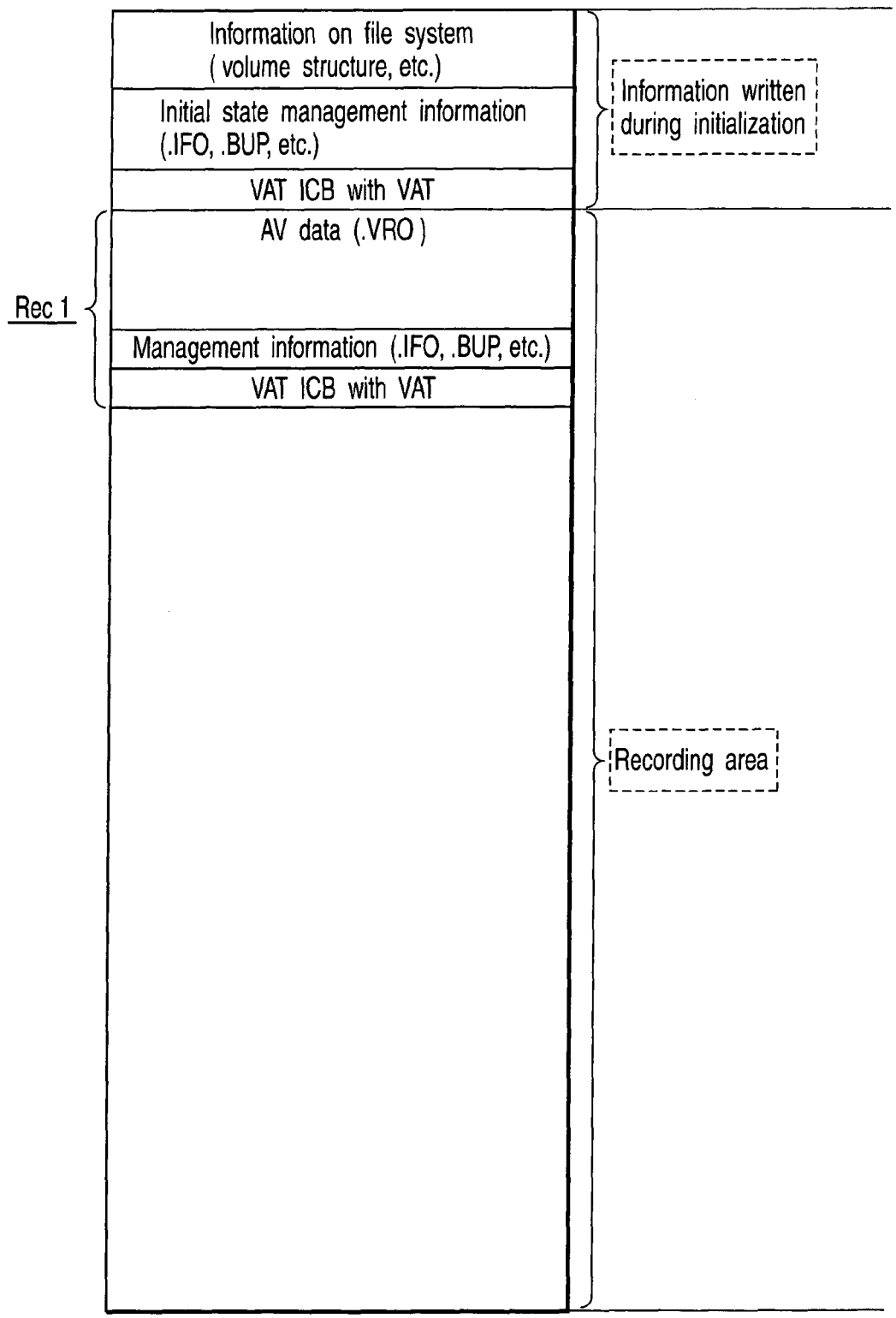
FIG. 14 is a schematic diagram showing a series of images indicating changes in the recording area of the DVD-R when a "recording time priority" mode is set.
Figure 15:
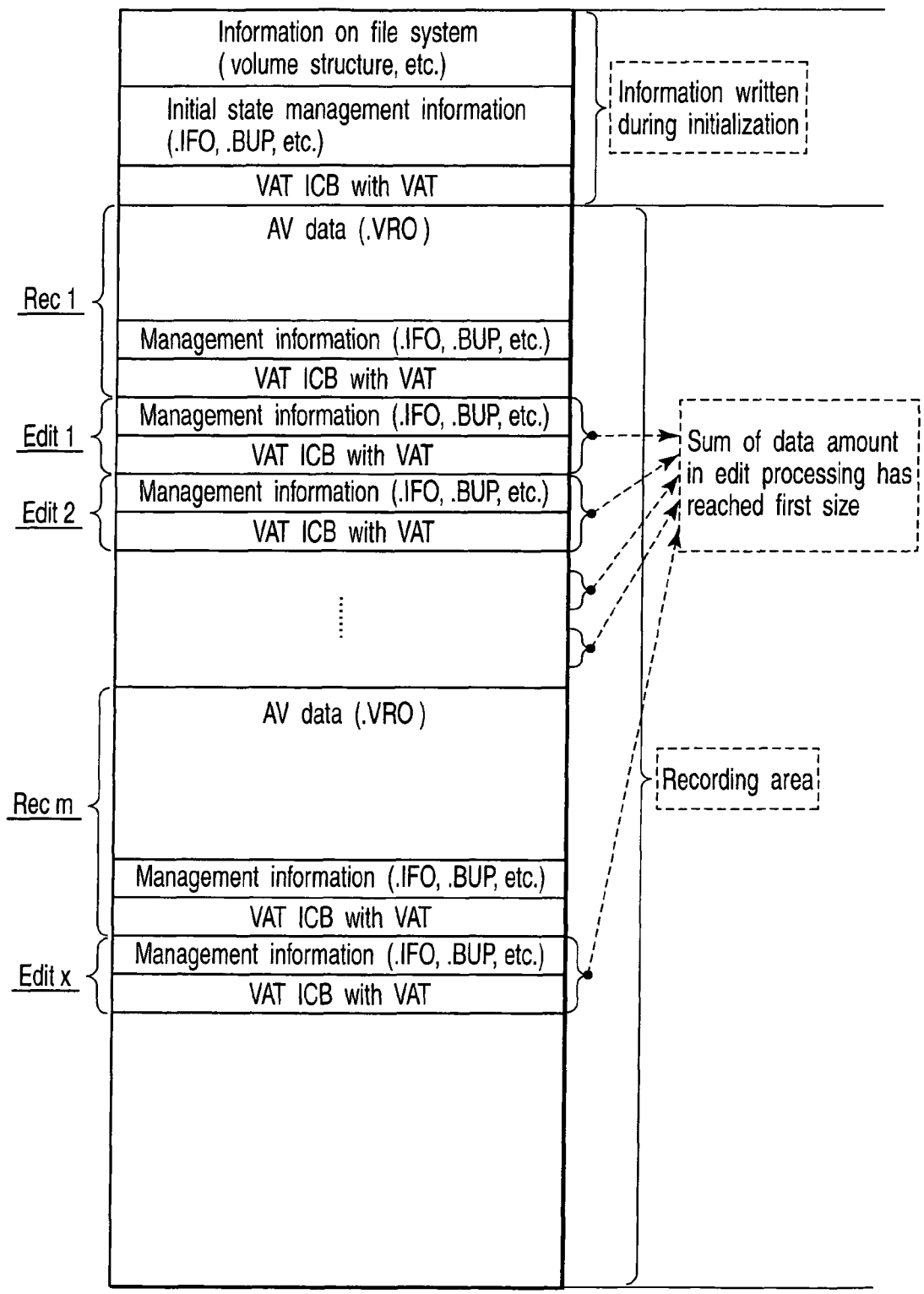
FIG. 15 is a schematic diagram showing a series of images indicating changes in the recording area of the DVD-R when the "recording time priority" mode is set.
Figure 16:
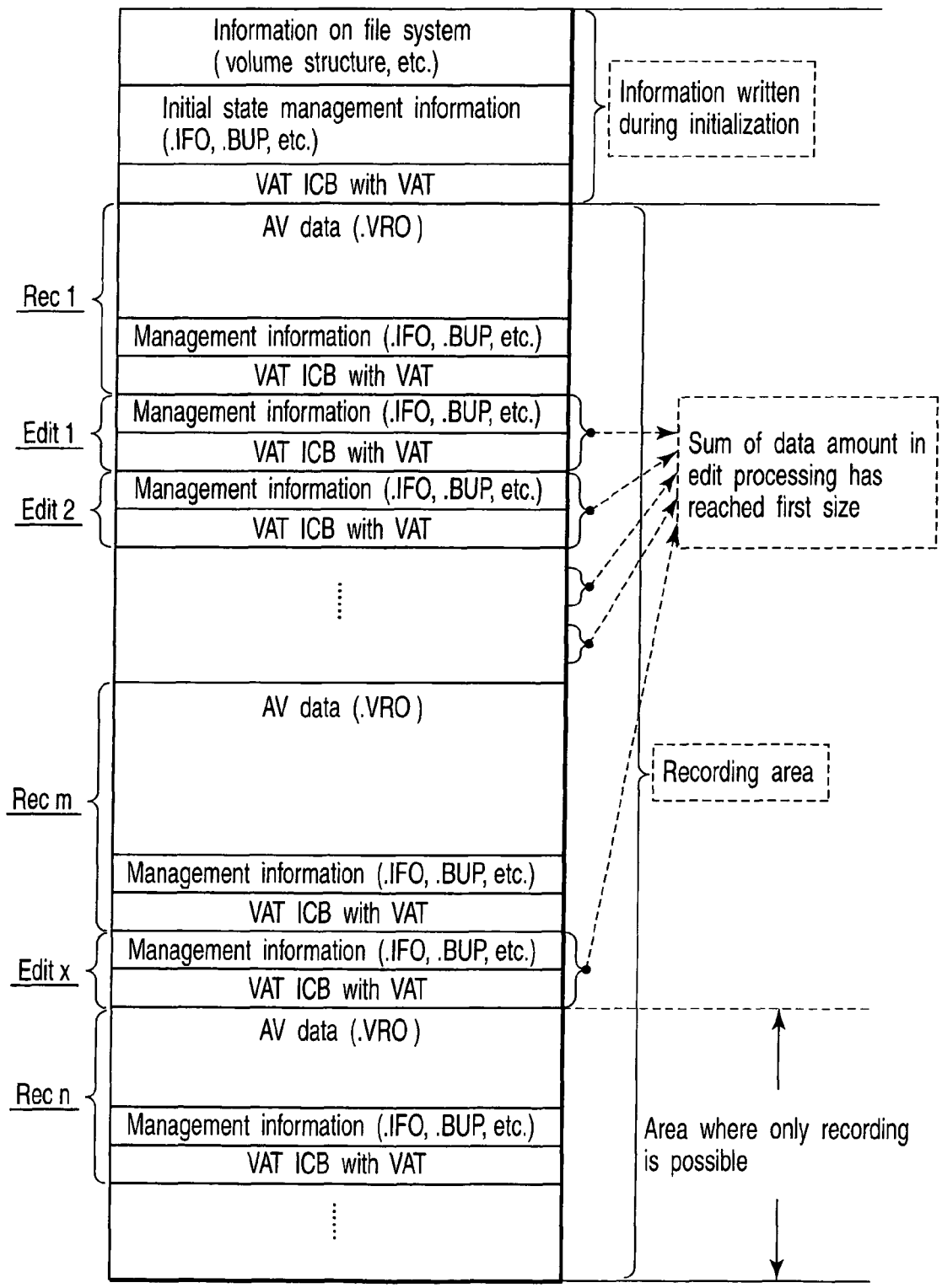
FIG. 16 is a schematic diagram showing a series of images indicating changes in the recording area of the DVD-R when the "recording time priority" mode is set.

FIG. 14 to FIG. 16 are a series of image diagrams showing changes in the recording area of the DVD-R when the "recording time priority" mode is set.

First, FIG. 14 shows a state in which one title indicated as "Rec_1" is newly recorded here while the state in FIG. 4 described above is the initial state. In this case, both the AV data (VR_MOVIE. VRO) and the management information (such as the VR_MANGR. IFO, VR_MANGR. BUP, original information of the picture recording apparatus) are recorded. Also, there is recorded the VAT ICB with VAT reflecting the recorded content of the disk which has been changed by recording.

Next, FIG. 15 shows a state in which the edit processing is performed a plurality of times and a plurality of titles is recorded. Here, since the "recording time priority" mode is set, the first size assigned to the data saving in the edit processing is treated as the upper limit for the edit processing, but it is assumed in FIG. 15 that a sum of the amounts of data consumed for the data saving in the edit processing has reached the first size at a point where xth edit processing is implemented.

Finally, FIG. 16 shows a state in which a title indicated as "Rec_n" is recorded. As described above with FIG. 15, the sum of the amounts of data consumed for the data saving in the edit processing has reached the first size at the point where the xth edit processing is implemented, so that no more new edit processing can be performed. In this case, the remaining recording area is all used for recording. Subsequently, recording can be implemented until the remaining amount of recording area on the DVD-R reaches zero.

Figure 17:
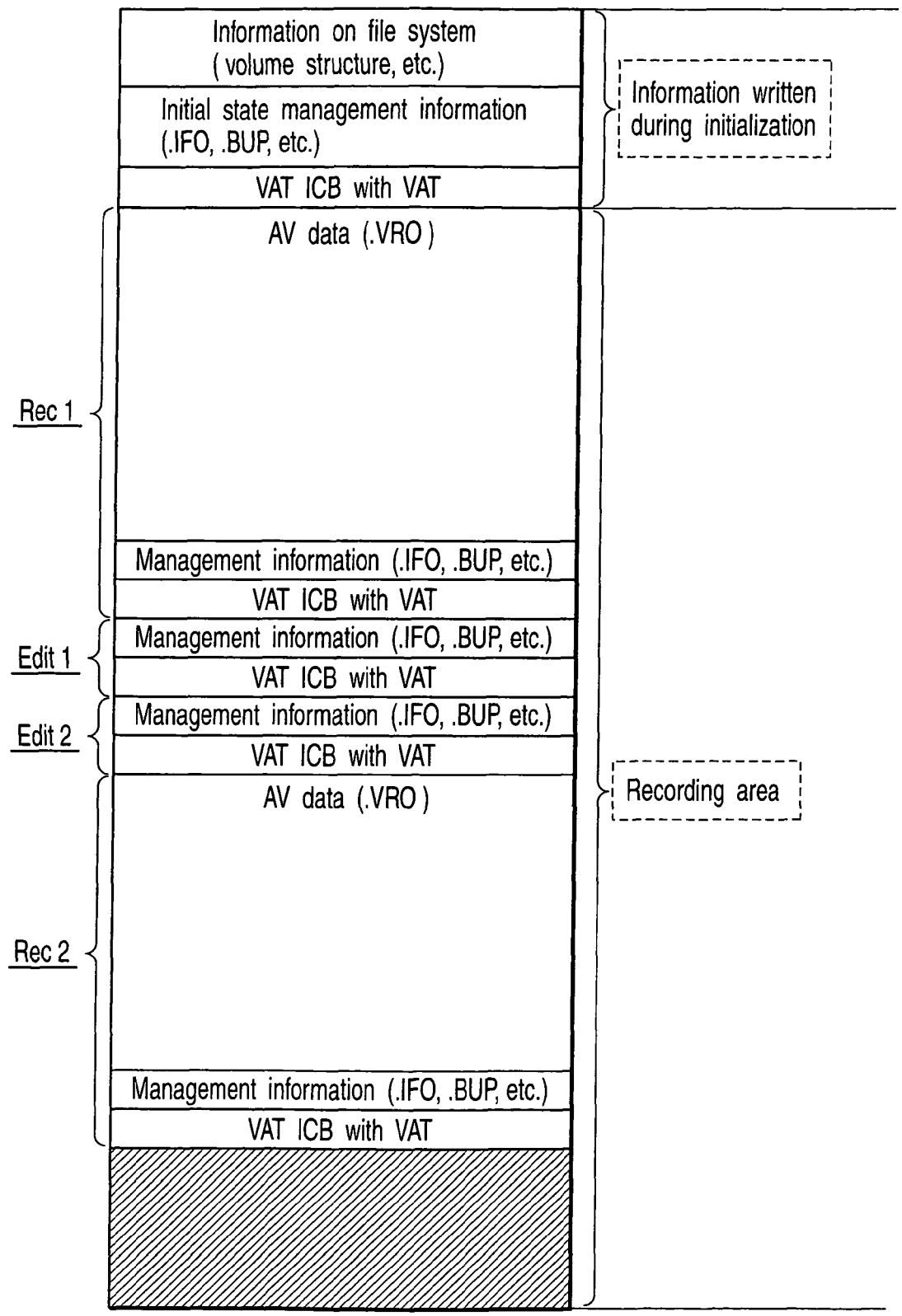
FIG. 17 is a schematic diagram showing a series of images indicating changes in the recording area of the DVD-R when a "no priority" mode is set.
Figure 18:
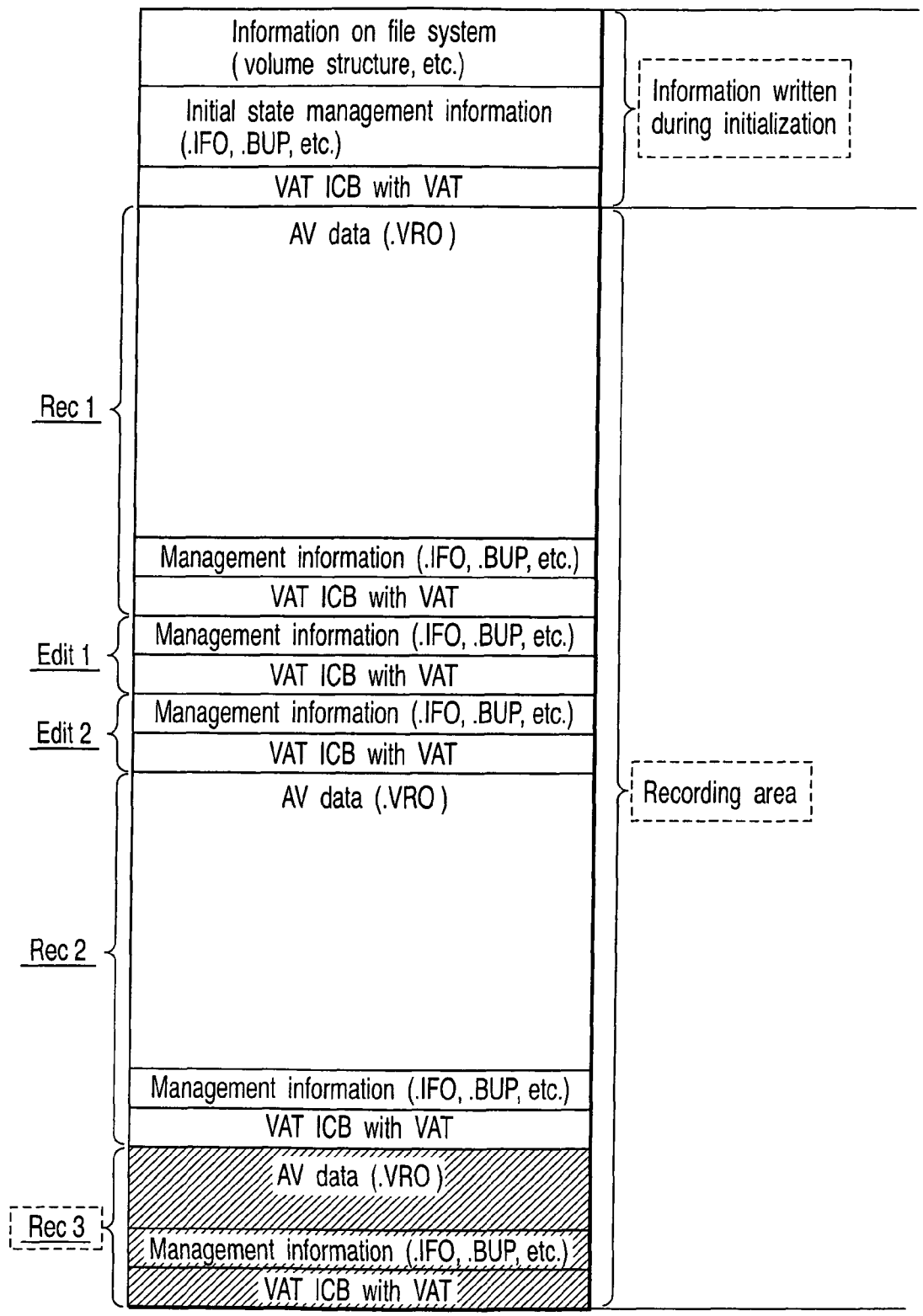
FIG. 18 is a schematic diagram showing a series of images indicating changes in the recording area of the DVD-R when the "no priority" mode is set.
Figure 19:
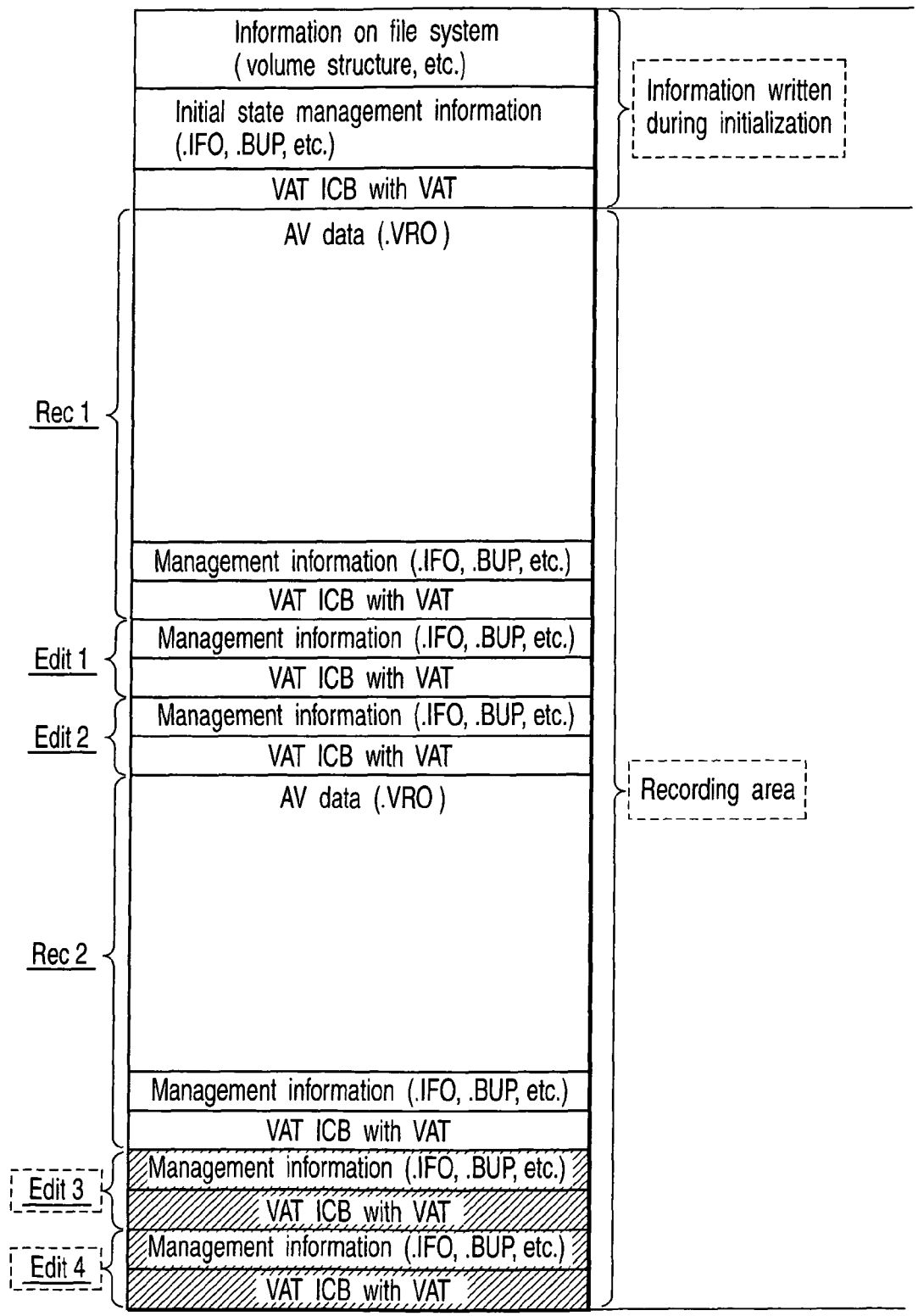
FIG. 19 is a schematic diagram showing a series of images indicating changes in the recording area of the DVD-R when the "no priority" mode is set.

FIG. 17 to FIG. 19 are a series of image diagrams showing changes in the recording area of the DVD-R when the "no priority" mode is set. First, FIG. 17 shows a state in which two titles indicated as "Rec_1" and "Rec_2" are newly recorded here while the state in FIG. 4 described above is the initial state and in which the edit processing is performed two times and data for the edit processing indicated as "Edit_1" and "Edit_2" are saved. In this case, since the "no priority" mode is set here, a shaded remaining part of the recording area can be used for both recording and editing.

FIG. 18 shows an example wherein the remaining part of the recording area is used for recording. In this case, a title indicated as "Rec_3" is recorded in the remaining part of the recording area.

On the other hand, FIG. 19 shows an example wherein the remaining part of the recording area is used for editing. In this example, the edit processing is performed two more times and data for the edit processing indicated as "Edit_3" and "Edit_4" are saved in the remaining part of the recording area.

While the embodiments of the present invention have been described above using the drawings, it should be appreciated that the content of the present invention is not limited to what has been described here, and various forms can be taken without departing from the spirit thereof.

For example, FIG. 4 shows the image of the data sizes assigned to recording and editing, which does not mean that the recording area is separated for recording and editing. Similarly, in the embodiment described using FIG. 10 to FIG. 19, the recording area is not separated for recording and editing. In particular, in a form taken in the series of image diagrams in FIG. 14 to FIG. 16 used to describe the "recording time priority" mode, the area where the data for the edit processing is saved is located in various places on the recording area, and the sum of the amounts of data consumed in these area is compared with the first size.

On the contrary, it should be appreciated that another embodiment is possible wherein the recording area is separated for recording and editing. It is also possible to take various forms as to how the separated parts for recording and editing for the data saving in edit processing are arranged on the recording area. From the form in FIG. 4 shown above, it is possible to conceive a form wherein the area for recording is located in a first half of the recording area while the area for editing is located in a second half thereof.

Figure 20:
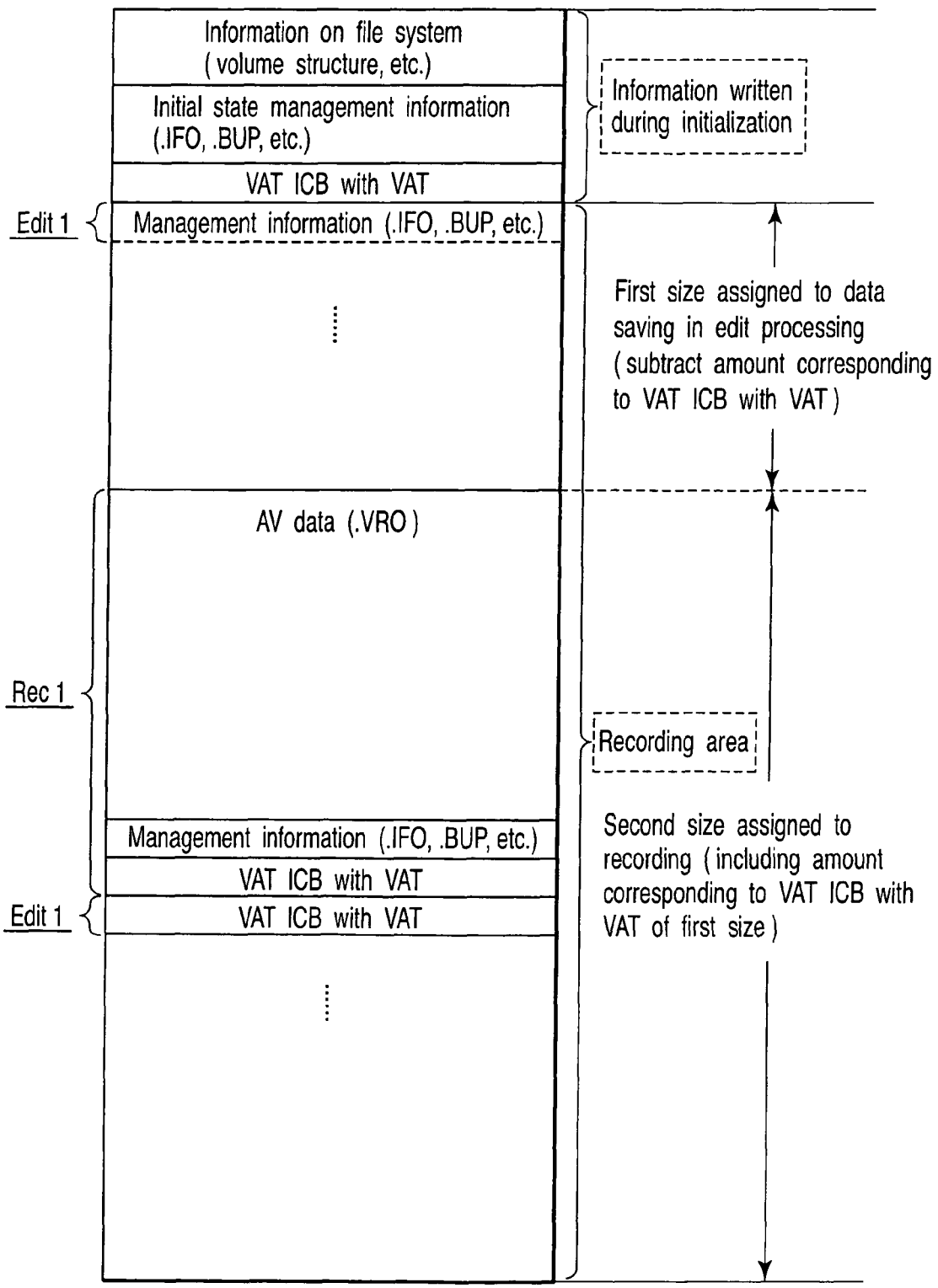
FIG. 20 is a schematic diagram showing a series of images indicating changes in the recording area of the DVD-R when the recording area is separated for recording and editing.

Furthermore, for example, as shown in FIG. 20, it is possible to conceive a form wherein the area for editing is located in the first half of the recording area while the area for recording is located in the second half thereof. It is to be noted that in the example as shown in FIG. 20, while the data for the edit processing (such as the VR_MANGR. IFO, VR_MANGR. BUP, original information of the picture recording apparatus) are recorded in the first half of the recording area, the VAT ICB with VAT reflecting the recorded content of the disk which has been changed by the edit processing must be recorded in the second half of the recording area. Therefore, in this case, adjustment processing is required wherein the data size corresponding to the VAT ICB with VAT for the number of editing to be implemented is subtracted from the first size, and the subtracted data size is added to the second data size.

Furthermore, it should be appreciated that when the recording area of data is separated for recording and editing as in FIG. 20, various forms can be taken for edit processing and recording which exceed the first size and second size assigned thereto. For example, a method can be conceived wherein the respective assigned data sizes are treated as the upper limits so that all recording and editing which exceed those sizes are not allowed. Conversely, it is also possible to conceive a method which allows the recording and editing exceeding the areas assigned thereto. In that case, for example, data in the edit processing exceeding the size 1 are recorded in the area originally assigned to recording, and recording data exceeding the size 2 are recorded in the area originally assigned to editing.

According to the measures described in the present embodiment, even when the long-time recording, recording of a large number of titles or recording at a high encoding rate is performed, in the DVD VR format, on the DVD-R which is the write-once medium, the edit processing can be performed to a certain degree, thereby improving convenience for the users.

It is to be noted that this invention is not directly limited to the embodiments described above, and can be embodied in an implementation stage with modified components without departing from the spirit thereof. Further, various inventions can be formed by a proper combination of a plurality of components disclosed in the embodiments described above. For example, some components can be eliminated from all the components shown in the embodiment. Moreover, components in different embodiments can be properly combined.

As described above, in the recording/reproducing apparatus of the present invention, even when the long-time recording, recording of a large number of titles or recording at a high encoding rate is performed in the DVD VR format on the DVD-R which is the write-once medium, editing can be performed under a certain range of conditions. Moreover, predetermined recording capacity which allows editing can be secured (set), thereby preventing a situation wherein the editing cannot be performed after recording.

It is to be noted that this invention is not limited to the embodiments described above, and various modifications and changes can be made in an implementation stage of the invention without departing from the spirit thereof. Further, a proper combination of embodiments may be implemented as required, in which case, effects produced by the combination can be provided.

What is claimed is:

1. An apparatus which records a picture on a write-once medium, the apparatus comprising:
   a data size specifying unit configured to secure a first size which ensures a selected number of editing operations on a recording area assigned to data saving in edit processing;
   a data size calculating unit configured to subtract the first size from a remaining amount of recording area in the write-once medium to calculate a second size secured for recording;

a recording unit configured to record an input picture using the second size as an upper limit; and an edit unit configured to edit the recorded picture using the first size as a lower limit.

2. The apparatus according to claim 1, further comprising:

an executing unit configured to execute the recording unit to record recording target data in an area subtracted by the data size calculating unit.

3. The apparatus according to claim 1, further comprising:

an instruction unit configured to instruct the edit unit to edit the recorded data in an area subtracted by the data size calculating unit.

4. The apparatus according to claim 1, further comprising:

a medium identification maintenance unit configured to maintain information on the write-once medium targeted to record or edit in association with an individual medium.

5. The apparatus according to claim 4, wherein the medium identification maintenance unit maintains initial state information regarding "to record or to edit" prescribed to the write-once medium in advance.

6. The apparatus according to claim 1, further comprising:

a medium information writing unit configured to record the information regarding "to record or to edit" on the write-once medium.

7. The apparatus according to claim 4, further comprising:

a medium information writing unit configured to record the information regarding "to record or to edit" on the write-once medium.

8. The apparatus according to claim 7, wherein the medium information writing unit configured to rewrites the information regarding "to record or to edit" recorded on the write-once medium.

9. The apparatus according to claim 1, further comprising:

a memory to store a default value of the number of editing operations.

* * * * *